(12) United States Patent
Boyer, Jr.

(10) Patent No.: US 8,934,063 B2
(45) Date of Patent: Jan. 13, 2015

(54) IN-FLIGHT ENTERTAINMENT SYSTEM

(75) Inventor: William J. Boyer, Jr., Kapaa, HI (US)

(73) Assignee: Skycast Solutions Inc., Seattle, WA (US)

(*) Notice: Subject to any disclaimer, the term of this patent is extended or adjusted under 35 U.S.C. 154(b) by 260 days.

(21) Appl. No.: 13/422,933

(22) Filed: Mar. 16, 2012

(65) Prior Publication Data

US 2013/0070171 A1 Mar. 21, 2013

Related U.S. Application Data

(60) Provisional application No. 61/454,165, filed on Mar. 18, 2011, provisional application No. 61/477,545, filed on Apr. 20, 2011, provisional application No. 61/484,611, filed on May 10, 2011, provisional application No. 61/499,999, filed on Jun. 22, 2011, provisional application No. 61/579,050, filed on Dec. 22, 2011.

(51) Int. Cl.
*H04N 5/655* (2006.01)
*B64D 11/00* (2006.01)
*B64D 11/06* (2006.01)

(52) U.S. Cl.
CPC ............ *H04N 5/655* (2013.01); *B64D 11/0015* (2013.01); *B64D 11/06* (2013.01); *B64D 2011/0679* (2013.01)
USPC ...... 348/837; 297/144; 297/146; 361/679.06; 361/679.07; 361/679.09; 361/679.22; 361/679.23; 725/77

(58) Field of Classification Search
CPC ............... B64D 11/0015; B64D 11/06; B64D 2011/0679; H04N 5/655
USPC .............. 348/837; 297/144, 146; 361/679.06, 361/679.07, 679.09, 679.22, 679.23; 725/77

See application file for complete search history.

(56) References Cited

U.S. PATENT DOCUMENTS

| | | | |
|---|---|---|---|
| 4,511,178 A * | 4/1985 | Brennan | 297/146 |
| 4,521,021 A | 6/1985 | Dixon | |
| 6,454,349 B1 | 9/2002 | Konya | |
| 6,489,745 B1 | 12/2002 | Koreis | |
| 6,899,390 B2 | 5/2005 | Sanfrod et al. | |
| 7,500,716 B2 | 3/2009 | Guerin et al. | |
| 2003/0184957 A1 | 10/2003 | Stahl et al. | |

(Continued)

FOREIGN PATENT DOCUMENTS

| JP | 02164635 | 6/1990 |
|---|---|---|
| WO | 03106261 | 12/2003 |

*Primary Examiner* — Christopher S Kelley
*Assistant Examiner* — Zhihan Zhou
(74) *Attorney, Agent, or Firm* — Davis Wright Tremaine LLP; George C. Rondeau, Jr.

(57) ABSTRACT

An in-flight entertainment (IFE) system that integrates a touch screen display device with a tray table (e.g., an airplane tray table or a train tray table) to provide a superior media experience. The IFE system is configured to be situated in an active use position wherein a user may interact with the touch screen and also use a tray table. The IFE system may be moved into a stowed position wherein it is positioned adjacent to a back of a passenger seat and operated in a passive viewing mode. The IFE system may include a bottom panel or tray portion having a window pane so that the display device is viewable when the IFE system is in the stowed position. A portable IFE system comprising a foldable clamp that clamps to an edge of a conventional table and folds into a stowed position is also disclosed.

20 Claims, 26 Drawing Sheets

(56) References Cited

U.S. PATENT DOCUMENTS

| | | | |
|---|---|---|---|
| 2003/0193220 A1* | 10/2003 | Jensen | 297/146 |
| 2003/0233659 A1* | 12/2003 | Guerin et al. | 725/77 |
| 2004/0125549 A1* | 7/2004 | Iredale | 361/681 |
| 2005/0053237 A1 | 3/2005 | Hanson | |
| 2005/0055228 A1 | 3/2005 | Boyer, Jr. et al. | |
| 2005/0055278 A1 | 3/2005 | Boyer, Jr. | |
| 2005/0132407 A1 | 6/2005 | Boyer, Jr. et al. | |
| 2005/0178297 A1 | 8/2005 | Pipkin | |
| 2006/0075934 A1* | 4/2006 | Ram | 108/44 |
| 2006/0158836 A1* | 7/2006 | Phillips | 361/681 |
| 2007/0047192 A1* | 3/2007 | Kobayashi et al. | 361/683 |
| 2007/0283855 A1 | 12/2007 | Pozzi | |
| 2008/0142585 A1* | 6/2008 | Foreman et al. | 235/380 |
| 2013/0093220 A1 | 4/2013 | Pajic | |

* cited by examiner

IN-FLIGHT ENTERTAINMENT SYSTEM

BACKGROUND OF THE INVENTION

1. Field of the Invention

The present invention is directed generally to entertainment systems and more particularly to in-flight entertainment systems that may be used with conventional tables such as aircraft tray tables.

2. Description of the Related Art

Recently, commercial aircraft have been providing in-flight entertainment (IFE) systems for passengers. These IFE systems may include displays for providing safety information, movies, or other video and audio data services such as e-mail and web access. The IFE systems may include audio devices, video devices, data storage, communications systems, and the like. As can be appreciated, safety, cost, weight, and reliability are all significant design criteria for IFE systems.

DETAILED DESCRIPTION OF THE INVENTION

The present invention is directed to in-flight entertainment (IFE) systems that are lighter, more ergonomic, more cost-effective, and more intelligent than currently available IFE systems. In some embodiments, the IFE systems of the present invention integrate audio-video entertainment systems with airline tray tables (or other types of tray tables) to provide a superior media experience for users in a highly efficient manner. These embodiments are described below and depicted in FIGS. 1-13. In other embodiments, the invention comprises a portable IFE system that is releasably couplable to a conventional table, such as a tray table of an aircraft, train, or the like or may be used in other situations where clamping the portable IFE system to a table or other item is desired. An embodiment of a portable IFE system is described below and depicted in FIGS. 14-18E.

Figure 1:
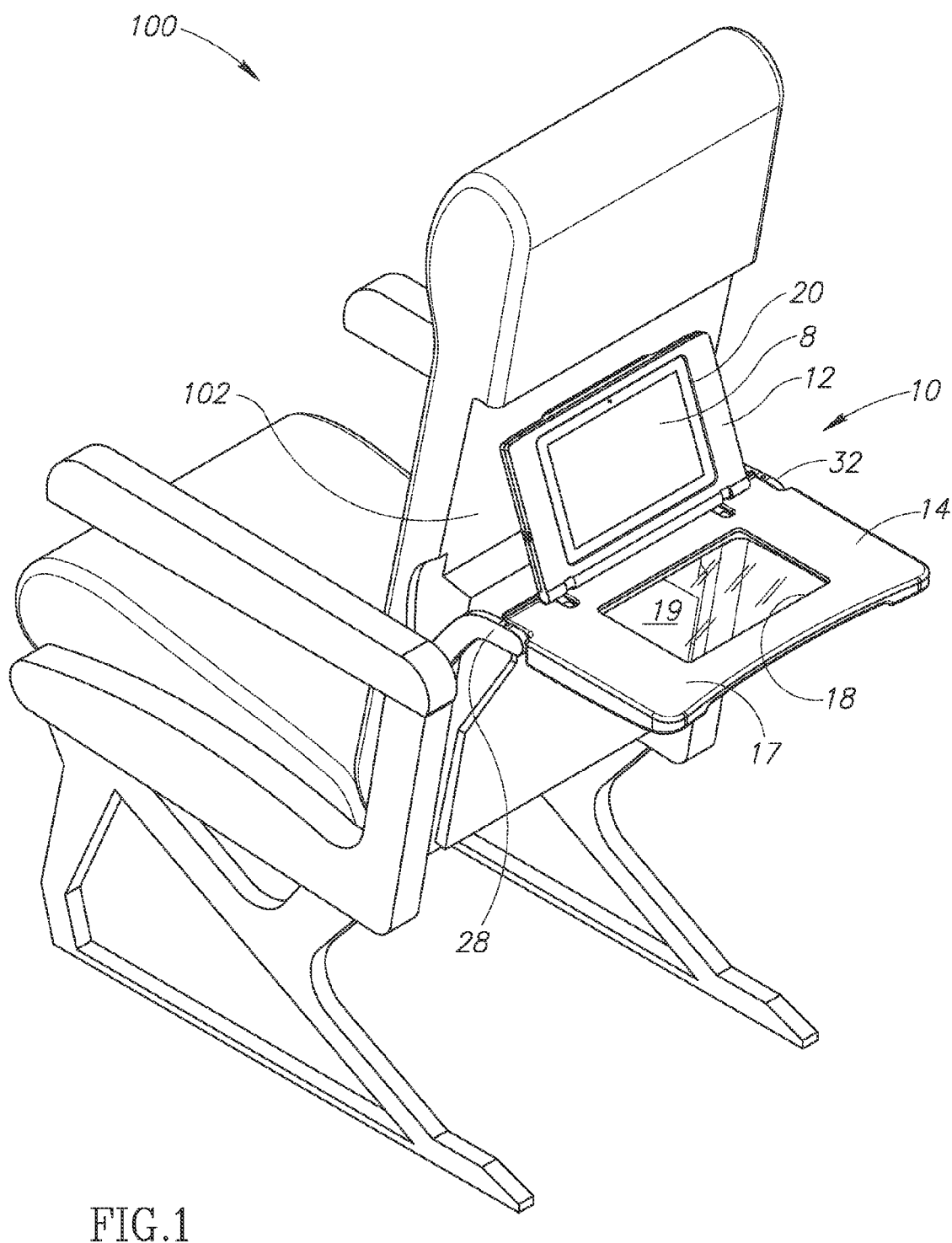
FIG. 1 is a front perspective view of an in-flight entertainment (IFE) system in accordance with a first embodiment of the present invention shown in a fully deployed open position.
Figure 2:
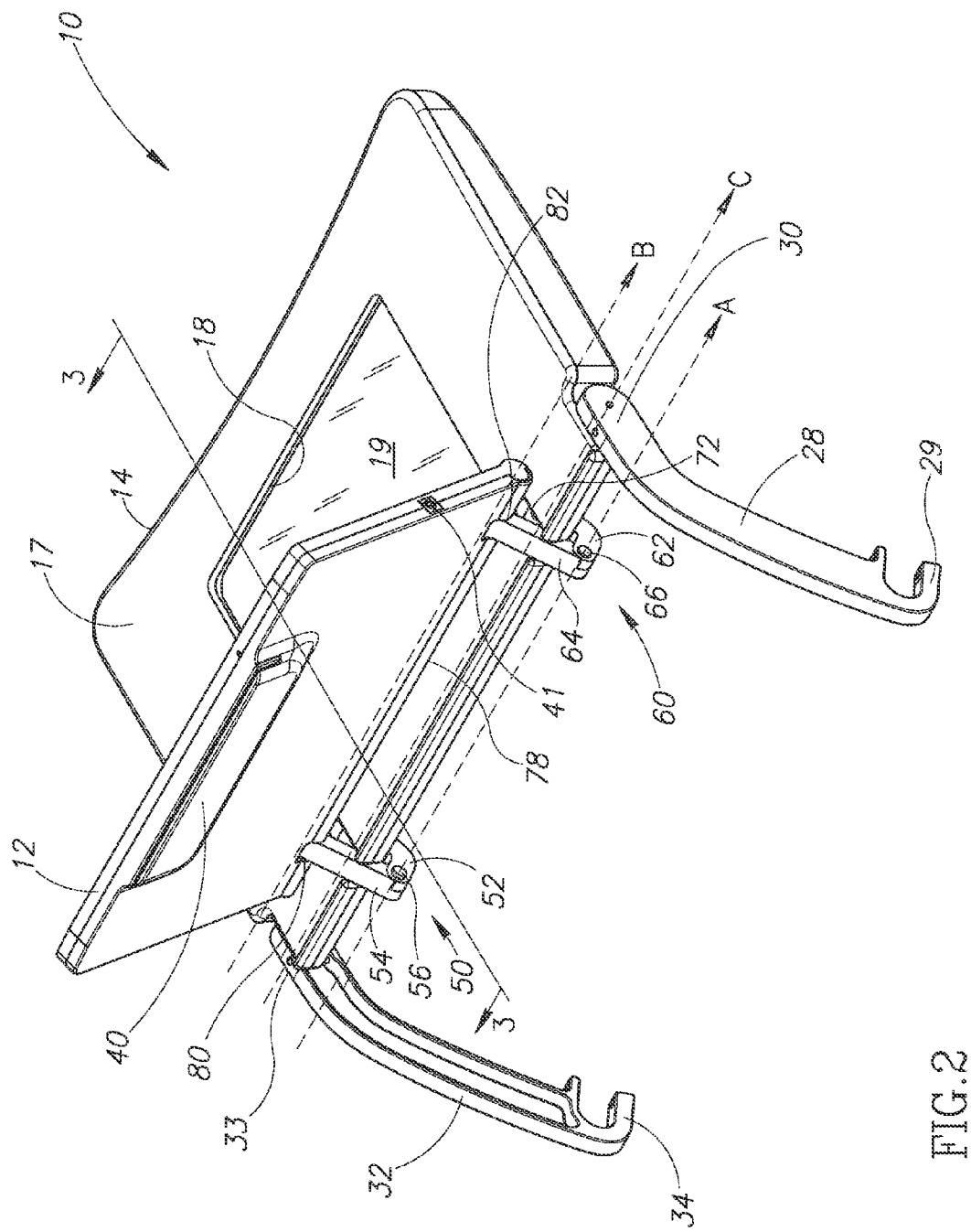
FIG. 2 is a back perspective view of the IFE system of FIG. 1.
Figure 3:
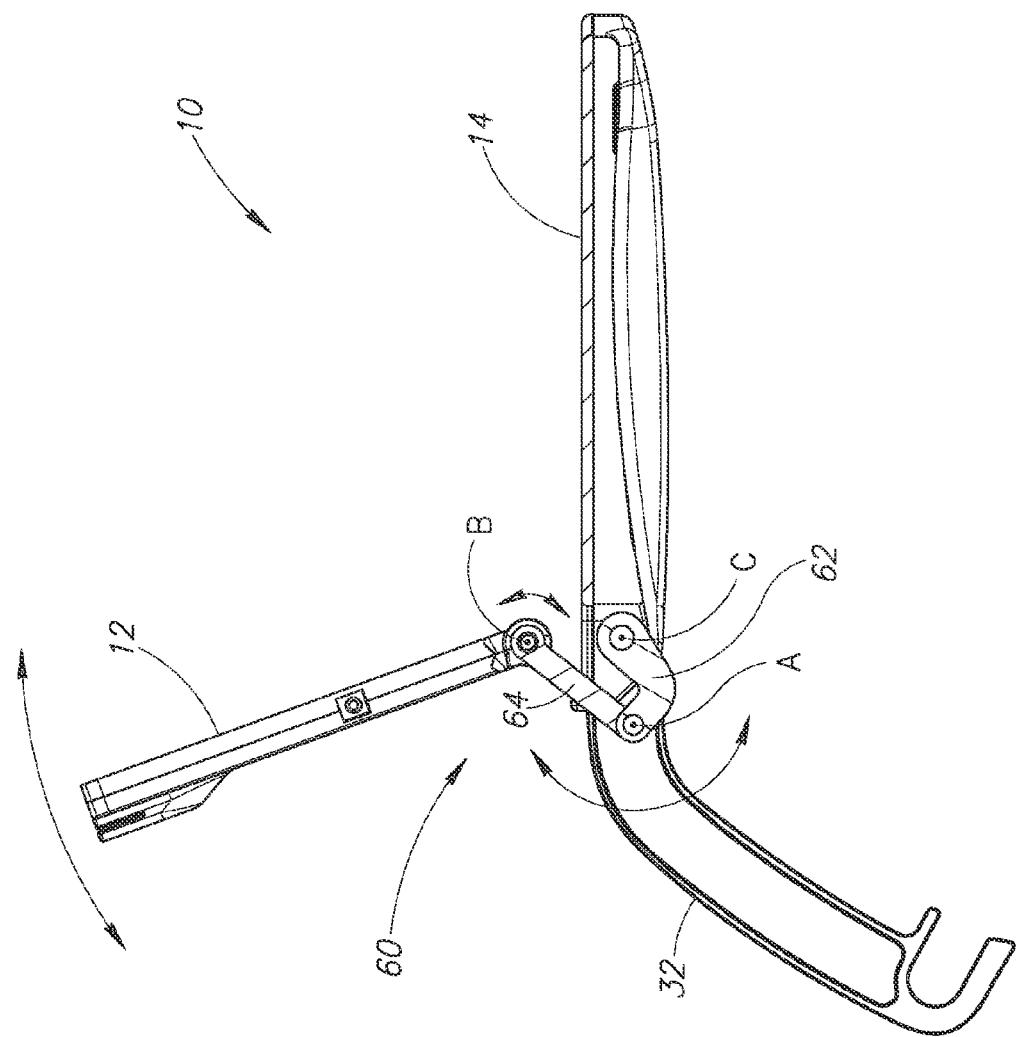
FIG. 3 is a left side cross-sectional elevational view of the IFE system of FIG. 1 taken substantially along the line 3-3 in FIG. 2.
Figure 4:
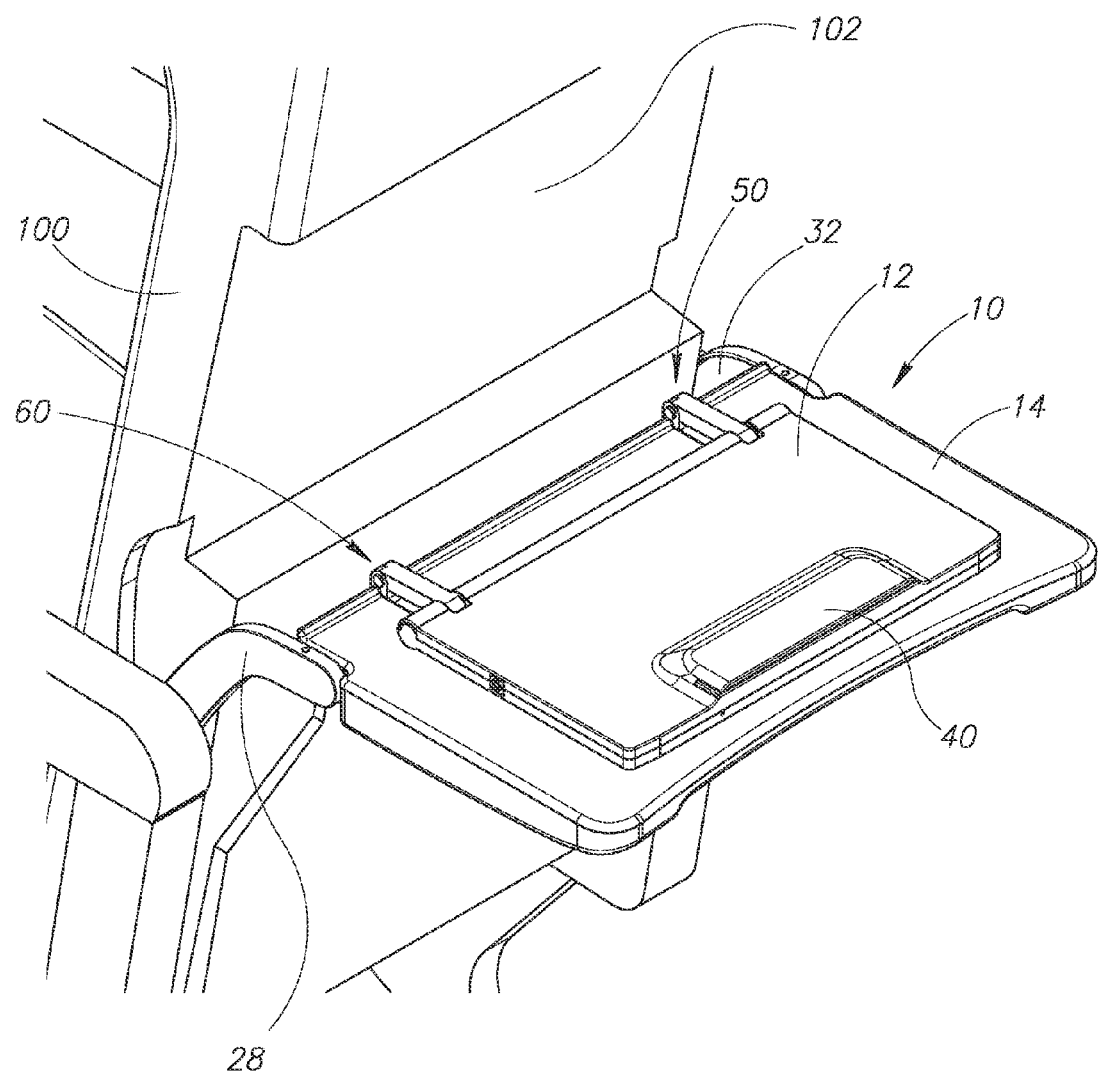
FIG. 4 is a front perspective view of the IFE system of FIG. 1 shown in a fully deployed, closed position with a display device adjacent a lowered tray table.
Figure 5:
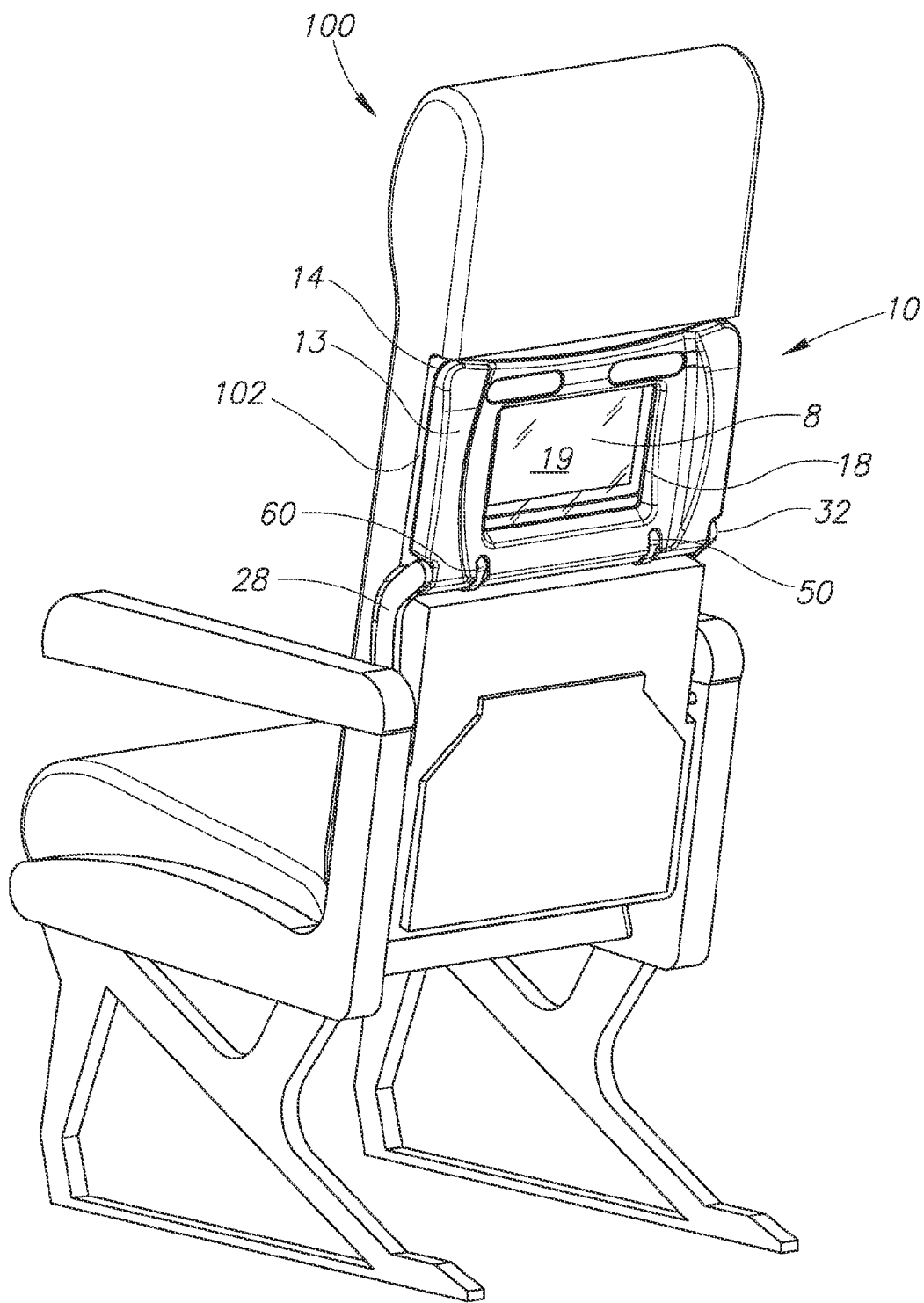
FIG. 5 is a front perspective view of the IFE system of FIG. 1 when the tray table is disposed in a stowed position and the display device is viewable through a window in the tray table.

FIGS. 1-6 illustrate various views of an in-flight entertainment (IFE) system 10 that is coupled to the back of an airplane passenger seat 100 in a similar manner as that of a conventional airline tray table. The IFE system 10 may also be used in trains, boats, automobiles, or in other environments as desired. The IFE system 10 is usable by a passenger sitting in a seat (not shown) that is directly behind the passenger seat 100. The IFE system 10 is operative to be situated in two distinct operating positions. FIGS. 1-3 illustrate the IFE system 10 when it is in a fully deployed, open position. FIG. 5 illustrates the IFE system 10 when it is in a stowed position. FIG. 4 illustrates the IFE system 10 when it is in the fully deployed, closed position. The operation of the IFE system 10 when it is situated in each of these positions is described below.

Figure 6:
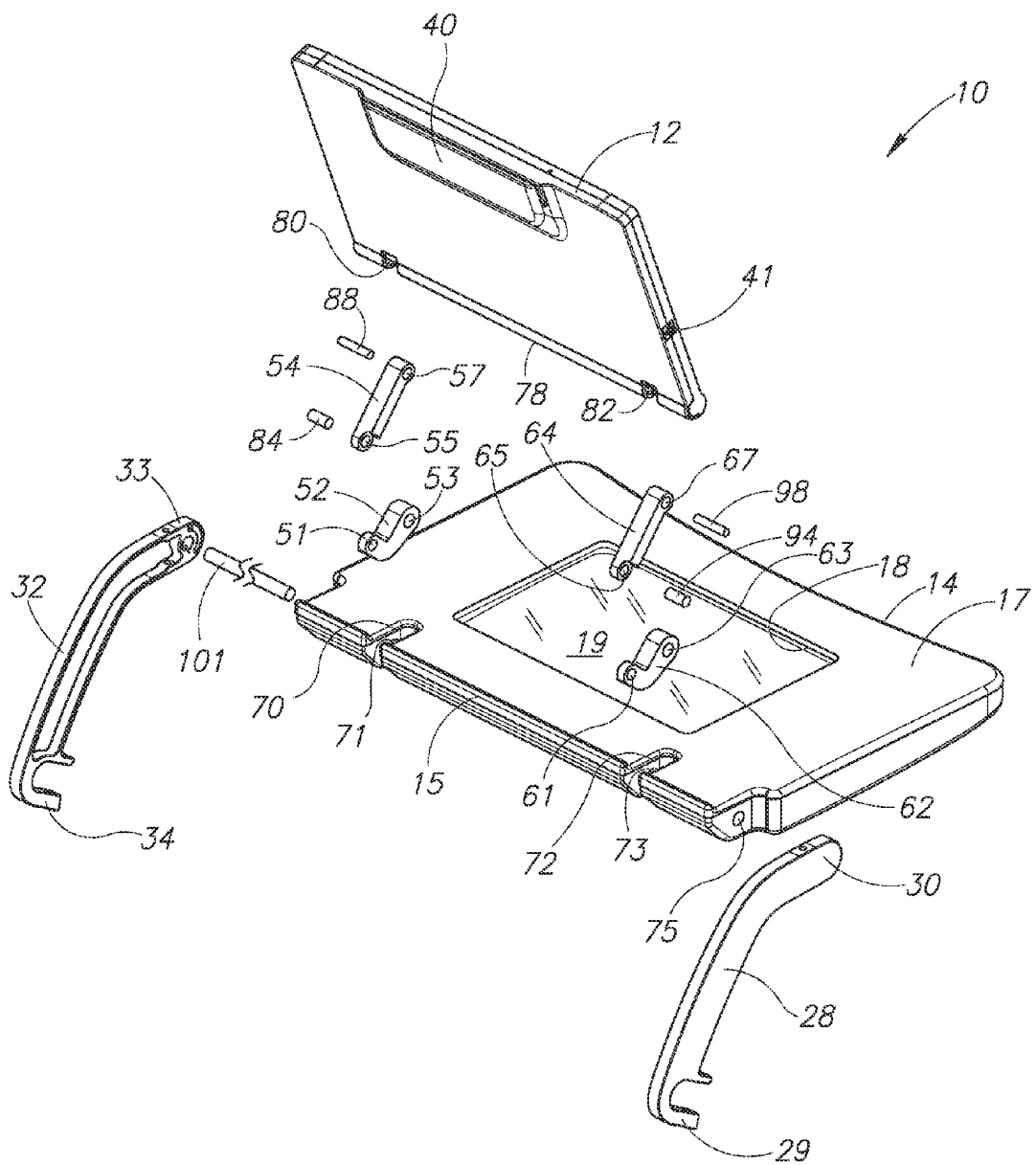
FIG. 6 is an exploded back perspective view of the IFE system of FIG. 1.

The IFE system 10 includes a tray 14 and a display carrier 12 that are pivotal relative to each other so that when the IFE system is deployed they may be moved between an open position (shown in FIGS. 1-3) and a closed position (shown in FIG. 4). As shown in FIG. 6, the tray table 14 includes an opening or channel 75 configured for receiving a crossbar 101 therethrough. The crossbar 101 is operative to couple one end with a crossbar coupling portion 30 of a left support arm 28 and another end with a crossbar coupling portion 33 of a right support arm 32. The left support arm 28 also includes a seat coupling portion 29 opposite the crossbar coupling portion 30 that is configured to permit pivotal coupling of the support arm with the seat 100 in a conventional manner. Similarly, the right support arm 32 includes a seat coupling portion 34 opposite the crossbar coupling portion 33 that is configured to permit pivotal coupling of the support arm with the seat 100 in the conventional manner.

The tray table 14 includes a right slot 70 and a left slot 72 proximate a rear portion 15 that provide openings 71 and 73, respectively, in the channel 75 that expose and provide access to the crossbar 101. As shown in FIG. 2, the display carrier 12 is couplable to these exposed portions of the crossbar 101 via a right display link arm assembly 50 and a left display arm link assembly 60. As shown in FIG. 6, the right display link arm assembly 50 comprises a lower portion 52 having a crossbar coupling opening or portion 53. The right display link arm assembly 50 also comprises an upper portion 54 having a display coupling portion 57 operative to facilitate pivotable coupling using a pin 88 between a coupling portion 80 of the display carrier 12 and the upper portion 54 of the link arm assembly 50. The upper portion 54 and the lower portion each include link coupling portions 55 and 51, respectively, that, using a pin 84, permit pivotal coupling between the upper portion and the lower portion of the left display link arm assembly 50. Similarly, the left display link arm assembly 60 comprises a lower portion 62 having a crossbar coupling opening or portion 63. The left display link arm assembly 60 also comprises an upper portion 64 having a display coupling portion 67 operative to facilitate pivotable coupling using a pin 98 between a coupling portion 82 of the display carrier 12 and the upper position 64 of the link arm assembly 60. The upper portion 64 and the lower portion each include link coupling portions 65 and 61, respectively, that, using a pin 94, permit pivotal coupling between the upper portion and the lower portion of the right display link arm assembly 60.

As shown in FIGS. 2 and 3, the coupling of the crossbar 101 and the display carrier 12 using the link arm assemblies 50 and 60 allows for pivotal movement about three axes of rotation A, B, and C. This feature gives the user significant freedom to adjust the height, forward/reward position, and tilt of the display carrier 12 (and therefore a display device 8). Axes of rotation A and C allows the lower portions 52 and 62 and the upper portions 54 and 64 of the link arm assemblies 50 and 60 to be rotated relative to the tray 14 to raise and lower and to move forward and rearward the display carrier 12 to a desired position. Axis of rotation B allows the display carrier 12 to be tilted forward or rearward.

The display carrier 12 houses a touch screen type display device 8 that is viewable through an opening 20 (see FIG. 1) positioned substantially in the center of the display carrier. The display device 8 may comprise a touch screen display, one or more processors, memory, communication interfaces, etc. Exemplary display devices include personal computers commonly referred to as tablet computers or simply "tablets." These devices are generally personal computers that are designed to use a touch screen as their primary input device. The display device 8 may be an application specific device, or may be a device that is readily commercially available. In some embodiments, the display device 8 is relatively thin and lightweight (e.g., 2 pounds, 1 pound, or even less). In some embodiments, the display device 8 is simply a "dumb" or thin client that receives content from a remotely located computer/server.

As shown in FIG. 2, the display carrier 12 also includes one or more ports 41 that allow users to connect peripheral devices to the display device 8. The port 41 may include a headphone port, USB port, and/or other suitable ports. The port 41 may include multiple ports of the same type (e.g., two headphone ports) so that multiple users can use the IFE system 10 simultaneously if desired. Further, the display carrier 12 may include one or more additional wired or wireless ports (not shown) configured for receiving power, communication signals, and the like.

The display carrier 12 may also include an integrated credit card reader 40 that allows users to make purchases directly using the touch screen display device 8. For example, a user may select movies, food, beverages, and the like using the display device 8 and then swipe a credit card through the credit card reader 40 to complete the purchase order. This feature eliminates the need for airline employees to accept cash or to carry separate credit card reading devices.

Although the embodiment shown includes the display device 8 integrated into the display carrier 12, in other embodiments the display carrier may include a display device support or pocket for receiving a plurality of types of display devices. In those embodiments, users may then insert a suitable display device such as a tablet computer into the display device support of the display carrier 12, and then operate the display device as described herein.

The tray 14 includes a bottom surface 13 (see FIG. 5) and a top surface 17 (see FIG. 2). The tray 14 also includes a rectangular-shaped opening 18 therethrough sized to be approximately the same size as or slightly larger than display portion of the touch screen display device 8. In some embodiments, a panel 19 comprising a transparent material is disposed within and covering the opening 18 to form a transparent portion of the tray 14. The transparent panel 19 may be formed from any suitable material such as plastic (e.g., acrylic glass), glass, or the like. When the IFE system 10 is in the upright or stowed position (see FIG. 5), the touch screen display device 8 is viewable through the panel 19 disposed in the opening 18 of the tray 14. In some embodiments, the panel 19 may comprises a display device (e.g., a touch screen type display device) that allows a user view media on the panel when the IFE system 10 is in the stowed position.

As discussed above, when the IFE system 10 is in the upright or stowed position shown in FIG. 5, the IFE system is still operable and passengers are still able to view the display device 8 through the opening 18 in the tray 14. This allows for the display of such things as safety and informational videos in addition to brand imagery and sponsor advertising when the passengers are viewing the display in a passive viewing mode. Also, passengers are able to view movies or other entertainment during times when the IFE system 10 must be in the stowed position (e.g., during takeoff and landing, or when turbulent air is encountered during flight when the tray 14 must be moved to the upright position).

During use, a user may pivot the IFE system 10 rearward toward the user from the stowed position shown in FIG. 5 until the IFE system is oriented horizontally as shown in FIG. 4. In this configuration, the display device 8 is not viewable. The user may then simply pivot the display carrier 12 upward relative to the tray 14 until the display device 8 is at a suitable viewing angle. Then the user can view videos on the display device 8 and interact with it using the built-in touch screen. When the IFE system 10 is in the open or active use position shown in FIGS. 1, 2, and 3, users may also use the top surface of the tray table 14, including the panel 19 covering the opening 18, as a table top. As can be appreciated, these steps may be repeated in reverse to return the IFE system 10 to the stowed position shown in FIG. 5.

Some passenger seats on an airplane do not have a seat in front of them. These seats are generally ones directly behind a divider or wall and are commonly referred to as "bulkhead seats." In some embodiments, the IFE system 10 may be couplable to the divider or wall in front of these seats so that users may be able to use the IFE system 10 in a similar manner as those users sitting in seats that are directly behind another passenger seat.

In some embodiments, the IFE systems described herein include wireless communication capabilities that enable them to communicate with external devices. As an example, the IFE systems may be operative to wirelessly receive content from a server located on an aircraft. Further, the IFE systems may transmit commands to the server. Such commands may include purchases of entertainment, food, or beverages. In other embodiments, the IFE systems are configured for wired communication with external devices (e.g., servers or other computers). In either embodiment, the IFE systems may include non-volatile memory storage to store certain media and to receive and store other media received from the server.

The display devices 8 of the IFE systems may be powered in a number of ways. In some embodiments, the display devices 8 include a rechargeable battery that is selectively removable from the IFE system so that it may be connected to a power source to charge the battery. In this regard, airline personnel may simply remove the batteries from the display devices and charge the batteries as necessary by connecting them to a suitable power source. In other embodiments, the display devices may be directly coupled to an aircraft's electrical power source (e.g., by routing power cables to each of the display devices). As discussed above, the display carrier 12 of the IFE system 10 may include a power port configured to receive power from an aircraft's electrical power source. Even when the power is supplied by the aircraft's electrical power source, the IFE system 10 may include an internal battery source configured to supply power to the display device 8 for a brief period of time (e.g., 10 to 20 minutes, or the like). This configuration may be useful in situations where a primary power source, such as an aircraft's electrical power source, has been temporarily disabled or interrupted.

Figure 7:
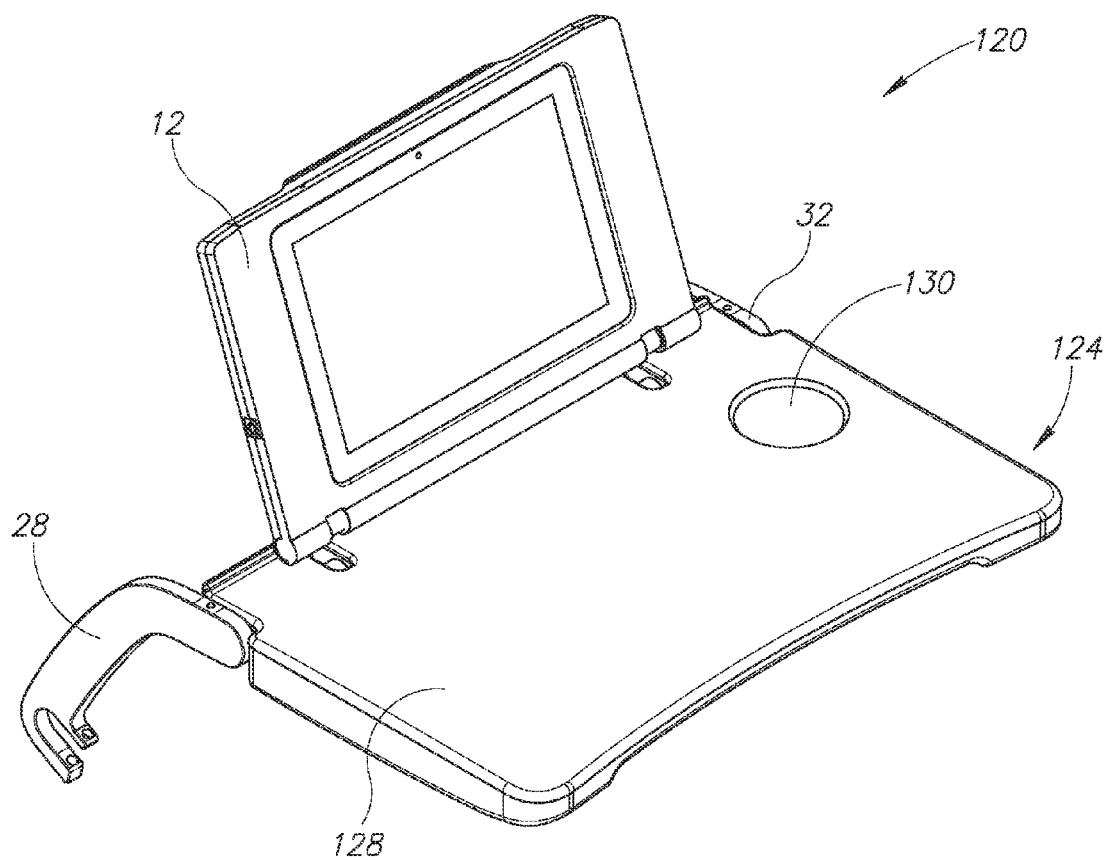
FIG. 7 is a front perspective view of an IFE system in accordance with a second embodiment of the present invention shown in a fully deployed, open position.
Figure 8:
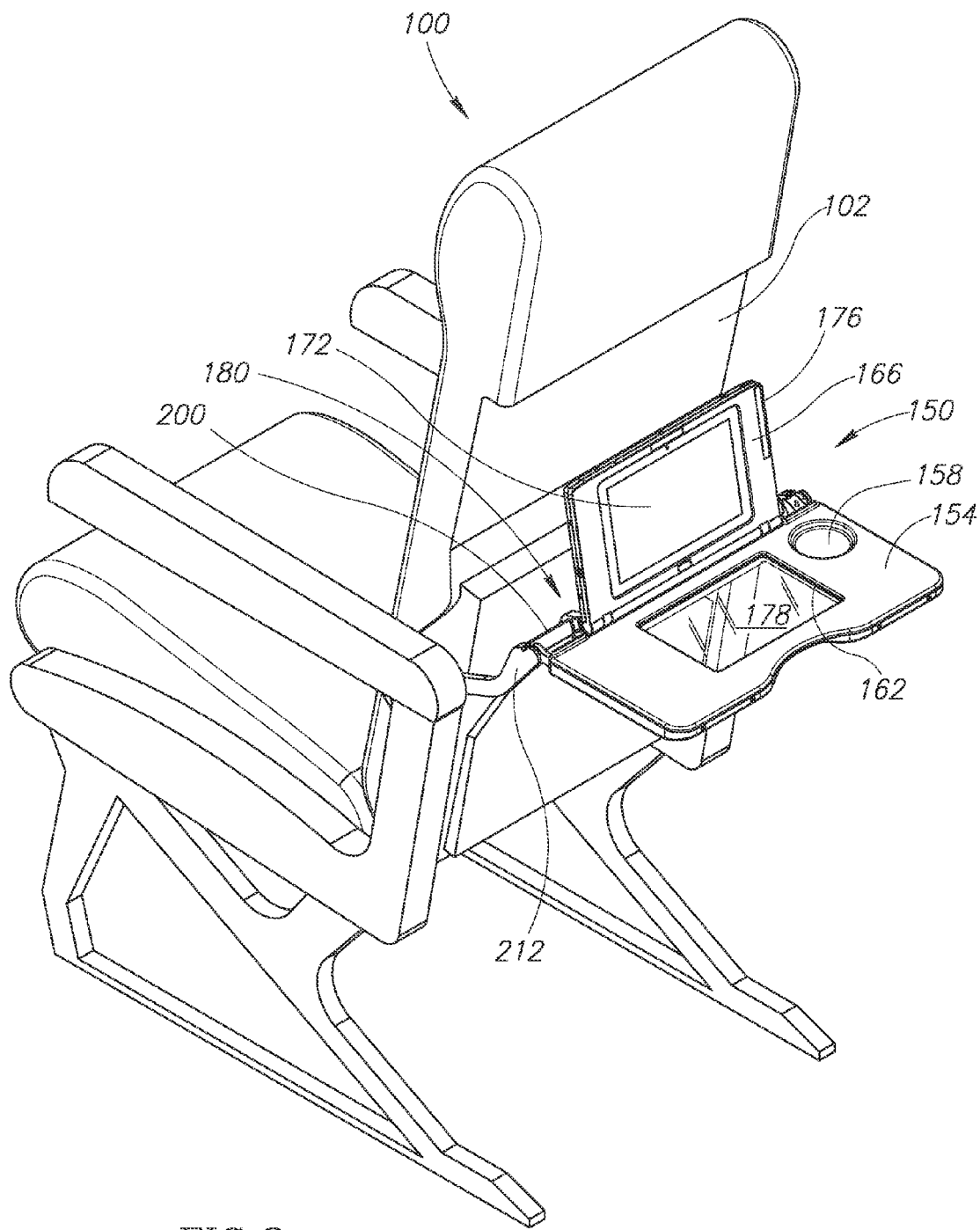
FIG. 8 is a front perspective view of an IFE system in accordance with a third embodiment of the present invention shown in a fully deployed, open position.

Another embodiment of an IFE system 120 is shown in FIG. 7. In this embodiment, a tray 124 is provided that does not include an opening therethrough. In this embodiment, the tray 124 functions as a conventional tray table, and includes a recessed portion 130 on a top surface 128 for receiving a bottom portion of a beverage container and preventing the beverage container from sliding on the top surface during movement of the aircraft. The tray 14 of the embodiment of FIG. 1-6 may also be provided with such a recessed portion for a beverage container.

Another embodiment of the present invention is directed to an IFE system 150 shown in FIGS. 8-13B. The IFE system 150 is similar to the IFE system 10 described above in several respects, so the description above regarding the IFE system 10 may well apply to the IFE system 150, and vise versa. The IFE system 150 includes a display carrier 166 housing a touch screen display device 172 therein. The touch screen display device 172 may be a custom device or may be a readily available device usable in other applications. The display carrier 166 may be formed from a material suitable to protect the display device 172. Such materials include plastic, aluminum, or other materials. As with the embodiment discussed above, the display carrier 166 also includes a payment card reader interface 176 configured to read a payment card when a user swipes the card through a slot in the interface 176. Although the payment card reader interface 176 is shown in the upper-right corner of the display carrier 166, it should be appreciated that the interface may be positioned at other locations as desired. The display device 172 may be similar to the display device 8 shown in FIGS. 1-6 and described above. Further, the display device 172 may include power and communication connections as described above.

Figure 9:
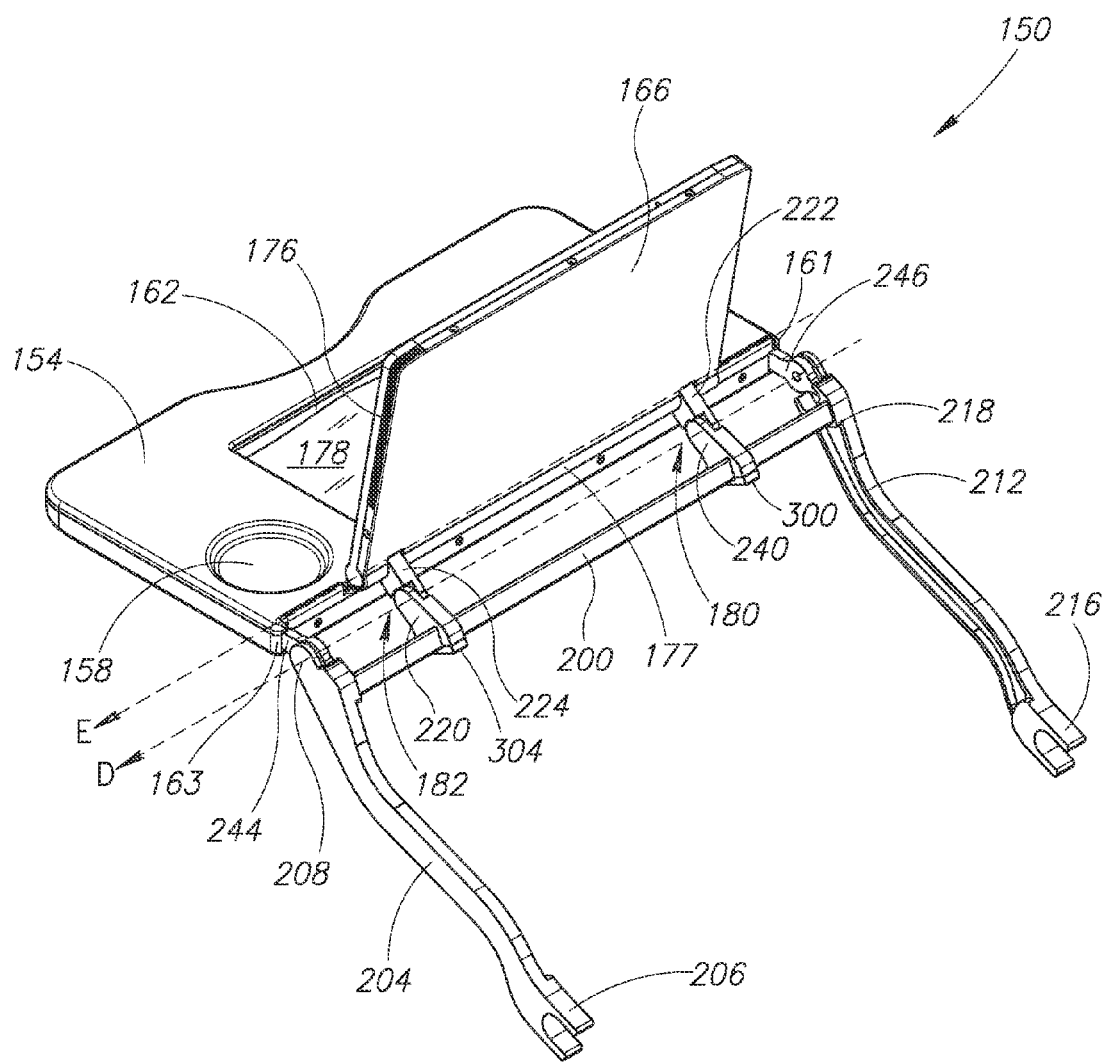
FIG. 9 is a back perspective view of the IFE system of FIG. 8.
Figure 12:
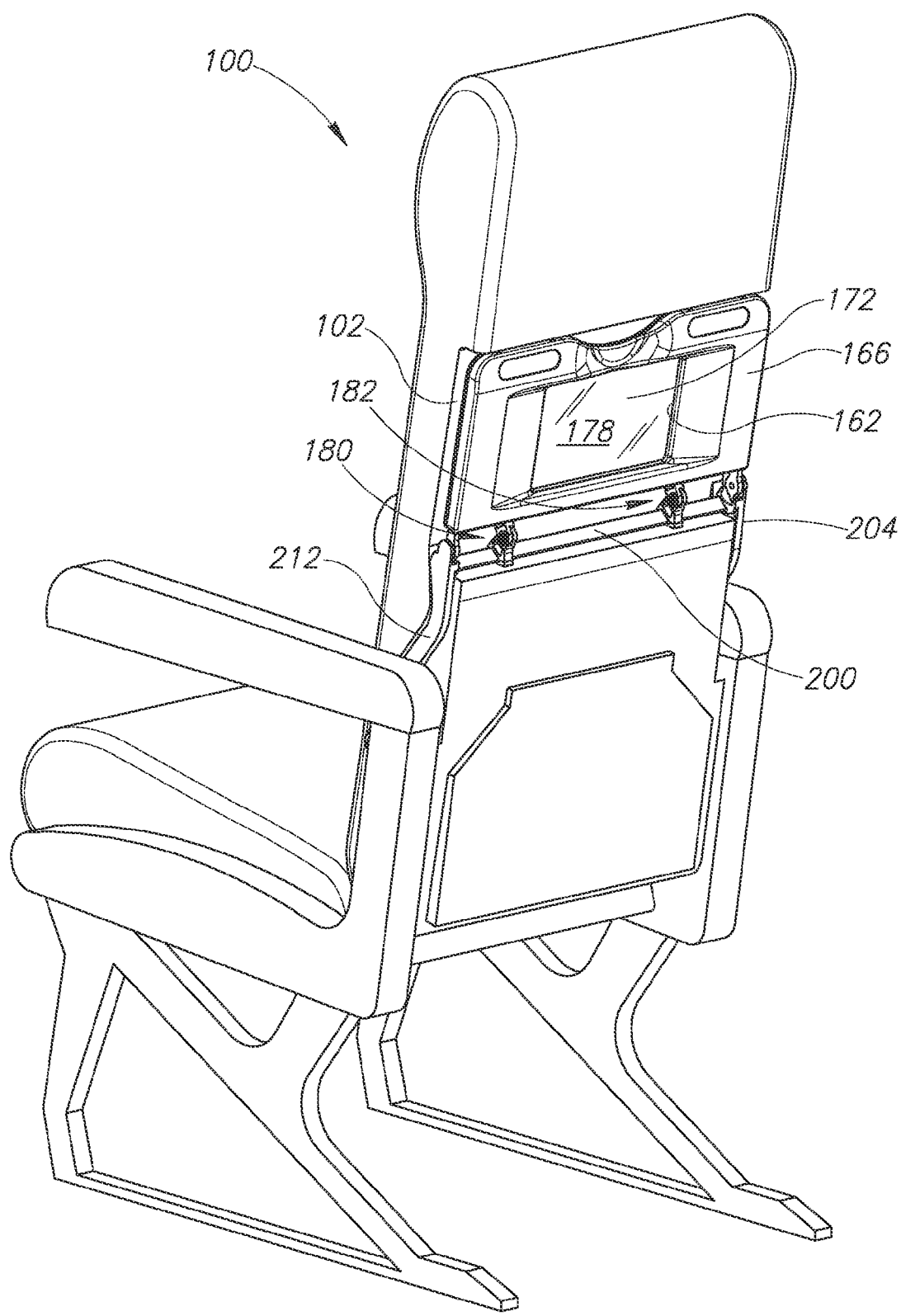
FIG. 12 is a front perspective view of the IFE system of FIG. 8 when the tray table is disposed in a stowed position and the display device is viewable through a window in the tray table.

As shown best in FIGS. 9 and 12, the IFE system 150 is operative to be selectively coupled to a crossbar 200 of a tray table 154. The crossbar 200 is fixedly positioned between two spaced apart cantilevered support members 204 and 212 at respective upper end portions 208 and 218 of the support members. The tray table 154 is also attached to the support members 204 and 212 by a right guide member 244 and a left guide member 246, respectively, which are configured to be slidably received within a right elongated slot 163 and a left elongated slot 161, respectively, of the tray 154 (see FIG. 13B). Ends 206 and 216 of the support members 204 and 216, respectively, are configured to attach the support members to the seat 100. The guide members 244 and 246 permit the IFE system 150 to be movable in a horizontal direction between a first position farther from a user (see FIG. 8) to a more rearward second position closer to a user (see FIGS. 10A and 10B). This feature allows users to position the tray 154 at a desired distance from themselves while the IFE system 150 stays stationary except for the adjusting movement described below.

In some embodiments, the IFE system 150 may include a custom crossbar, for example, when used with a conventional tray table that does not include a crossbar. In these embodiments, a custom crossbar may be configured to be fixedly positioned between the spaced apart support members 204 and 212 used for supporting the tray table.

Figure 13A:
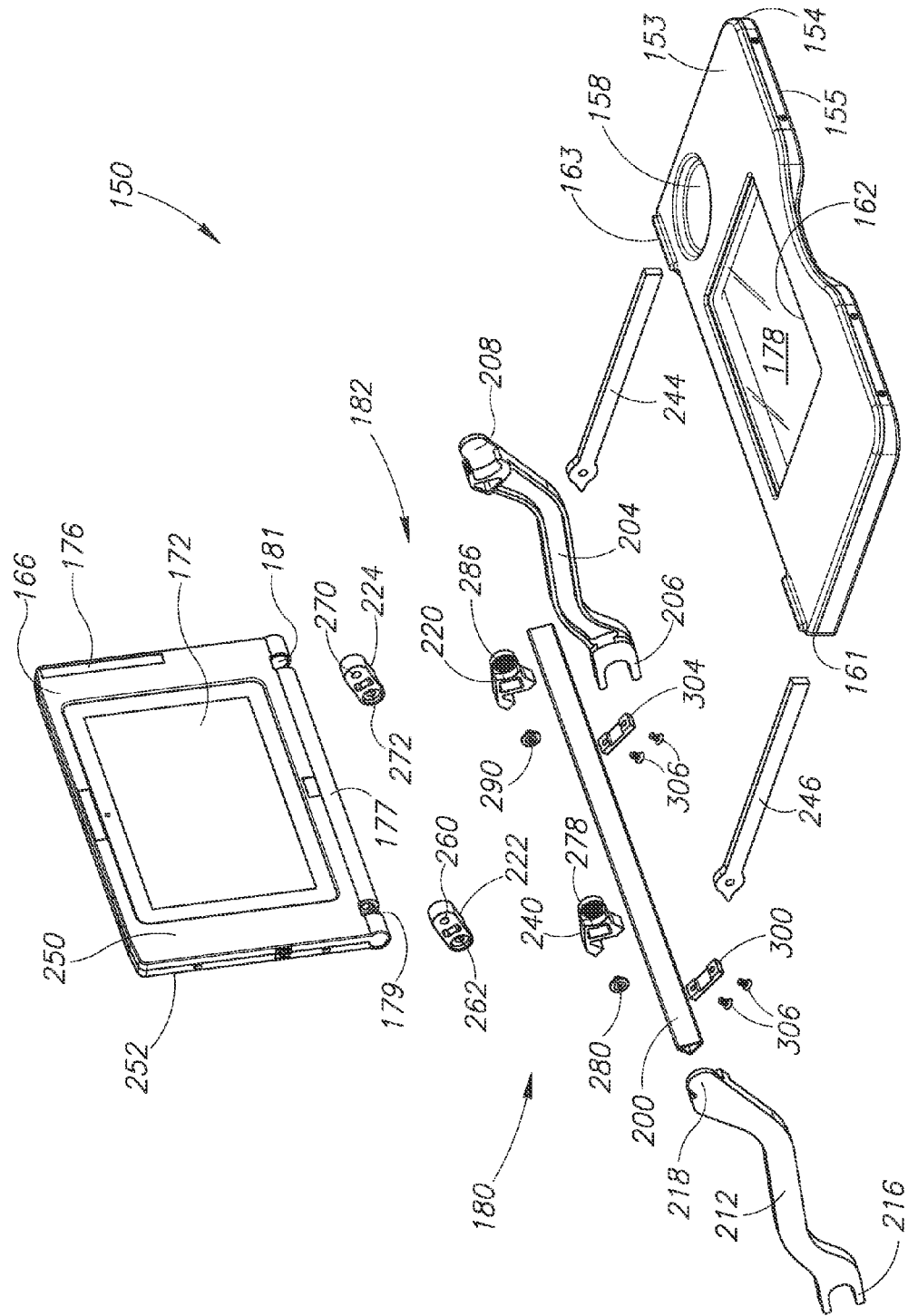
FIG. 13A is an exploded front perspective view of the IFE system of FIG. 8.
Figure 13B:
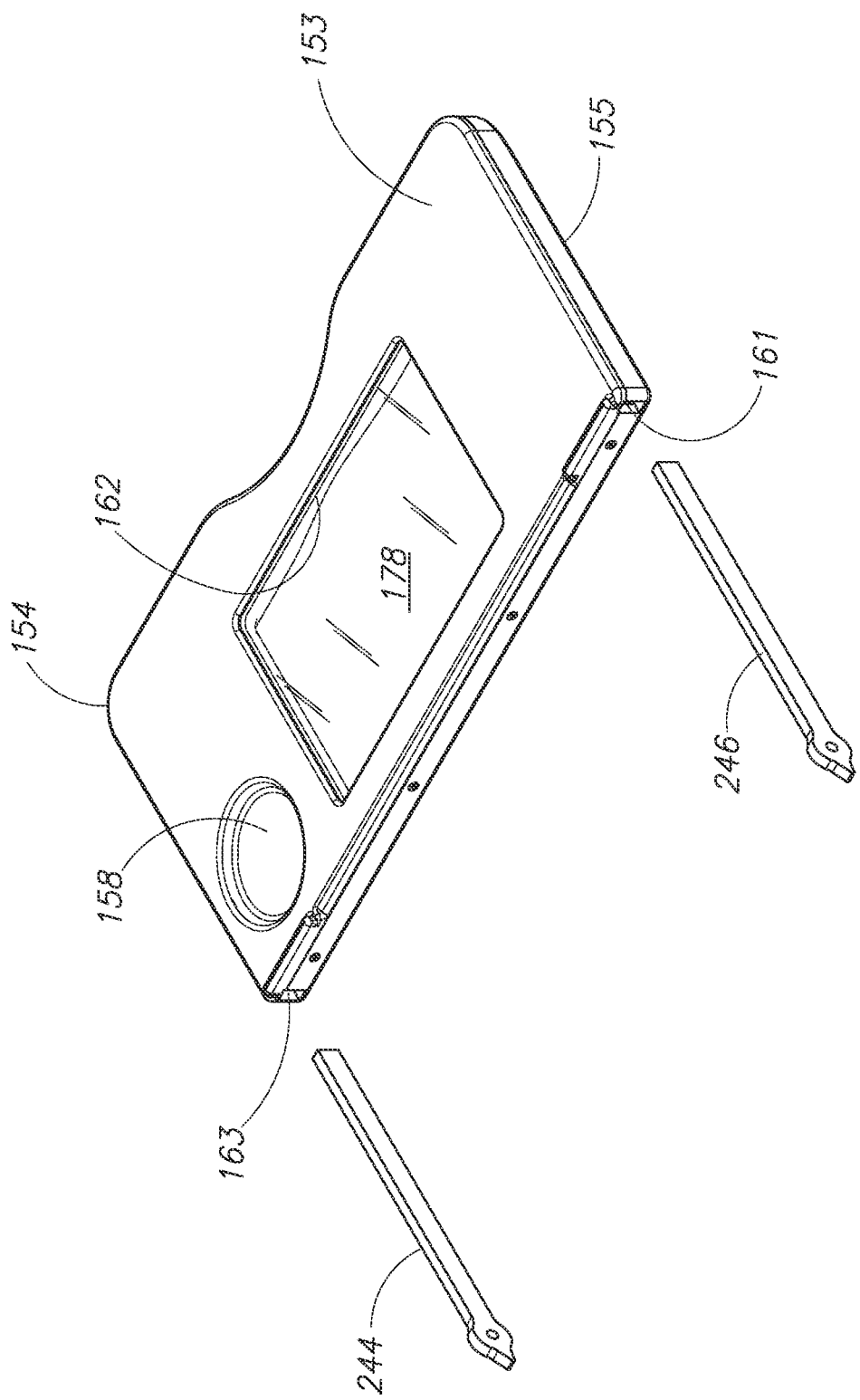
FIG. 13B is a partially exploded back perspective view of the tray table of the IFE system of FIG. 8.

As may best be viewed in FIGS. 9, 12, and 13A, the display carrier 166 is coupled to the crossbar 200 by a left link arm assembly 180 and a right link arm assembly 182. The left link arm assembly 180 includes a fixed pivot arm 240 that is retained on the crossbar 200 using a fixed pivot arm clamp 300 and screws 306. The left link arm assembly 180 also includes an upper link arm 222 that is pivotably coupled to the fixed pivot arm 240. Specifically, a connection point 278 of the fixed pivot arm 240 and a connection point 262 of the upper link arm 222 are pivotably coupled together and retained by a link arm cap 280. A display coupling portion 260 of the upper link arm 222 is also pivotably coupled to a left arm coupling portion 179 of the display carrier 166 disposed near its bottom portion 177. Thus, the display carrier 12 may pivot relative to the crossbar 200 at the connection point between the fixed pivot arm 240 and the upper link arm 222, and also at the connection point between the upper link arm 222 and the left arm coupling portion 179.

Similarly, right link arm assembly 182 includes a fixed pivot arm 220 that is retained on the crossbar 200 using a fixed pivot arm clamp 304 and screws 306. The right link arm assembly 182 also includes an upper link arm 224 that is pivotably coupled to the fixed pivot arm 220. Specifically, a connection point 286 of the fixed pivot arm 220 and a connection point 272 of the upper link arm 224 are pivotably coupled together and retained by a link arm cap 290. A display coupling portion 270 of the upper link arm 224 is also pivotably coupled to a right arm coupling portion 181 of the display carrier 166. Thus, the display carrier 12 may pivot relative to the crossbar 200 at the connection point between the fixed pivot arm 220 and the upper link arm 224, and also at the connection point between the upper link arm 224 and the right arm coupling portion 181.

Figure 10A:
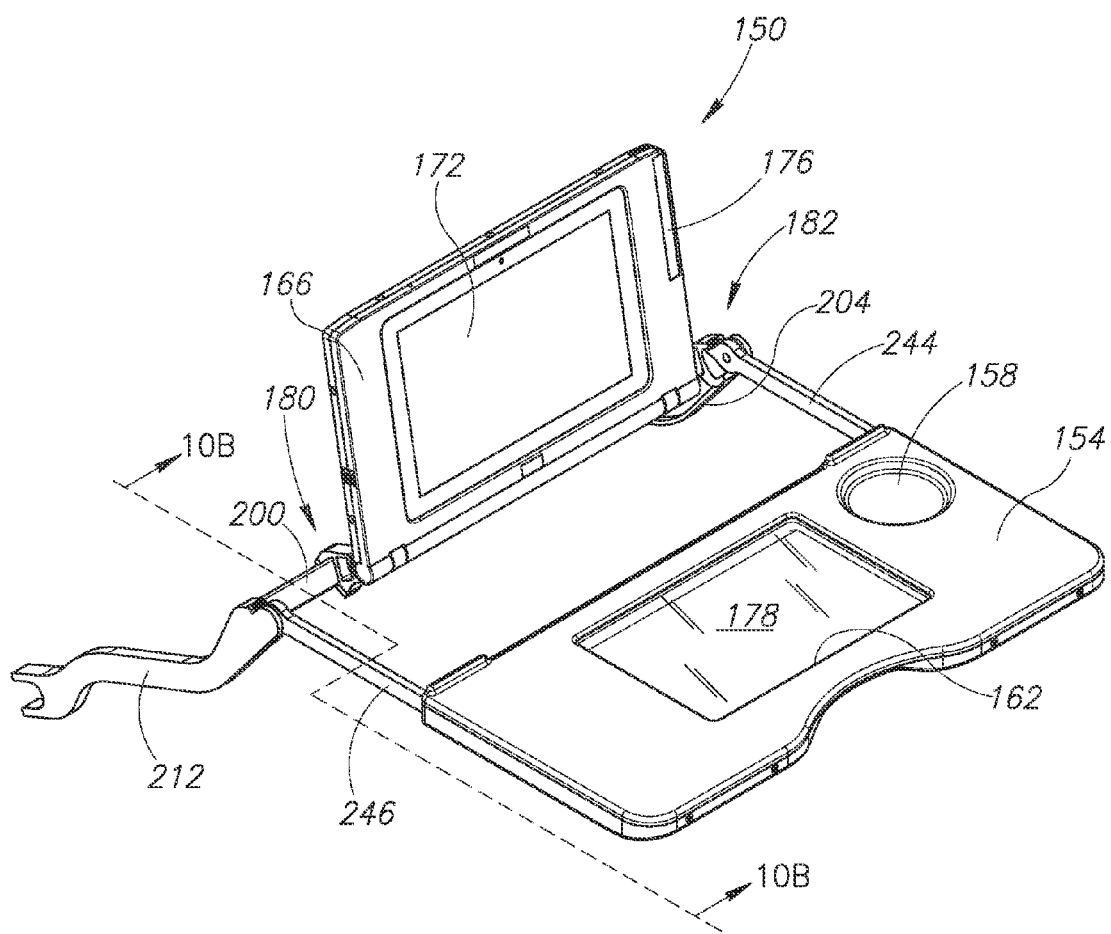
FIG. 10A is a front perspective view of the IFE system of FIG. 8 when a tray table is in a position extended rearward to a position apart from the display device.
Figure 10B:
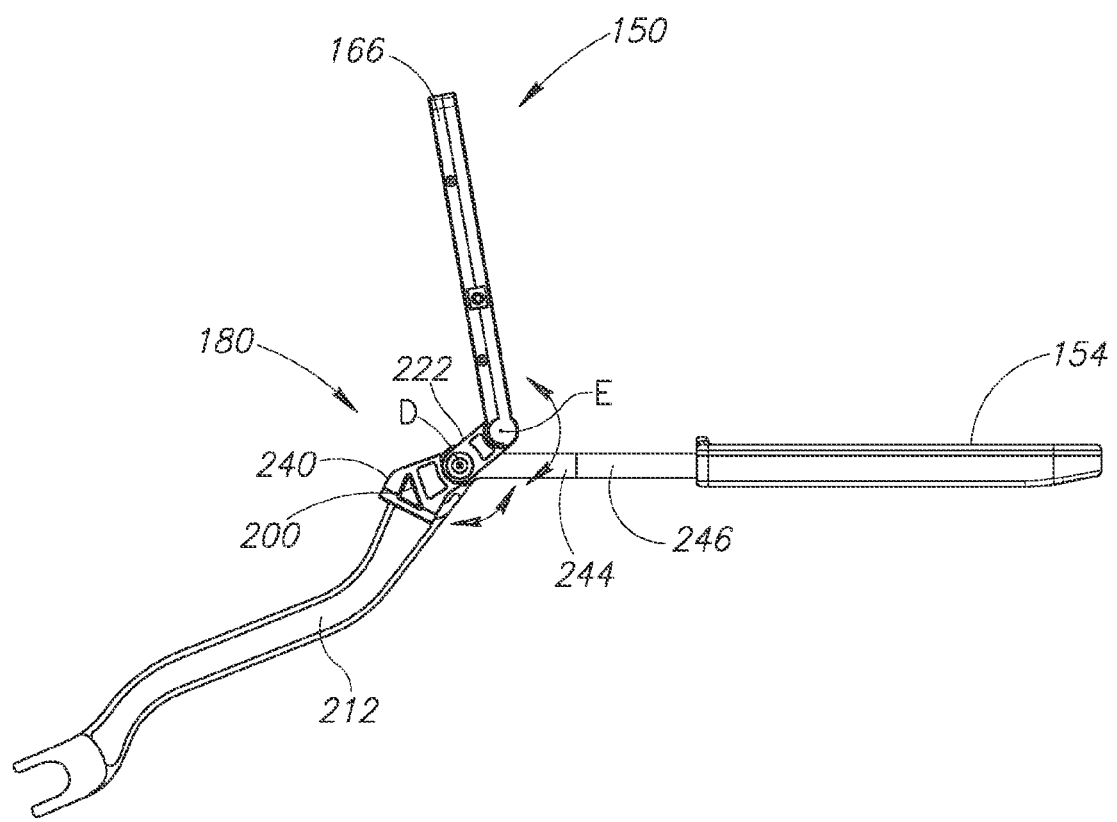
FIG. 10B a cross-sectional view of the IFE system of FIG. 8 taken substantially along the line 10B-10B in FIG. 10A.
Figure 11:
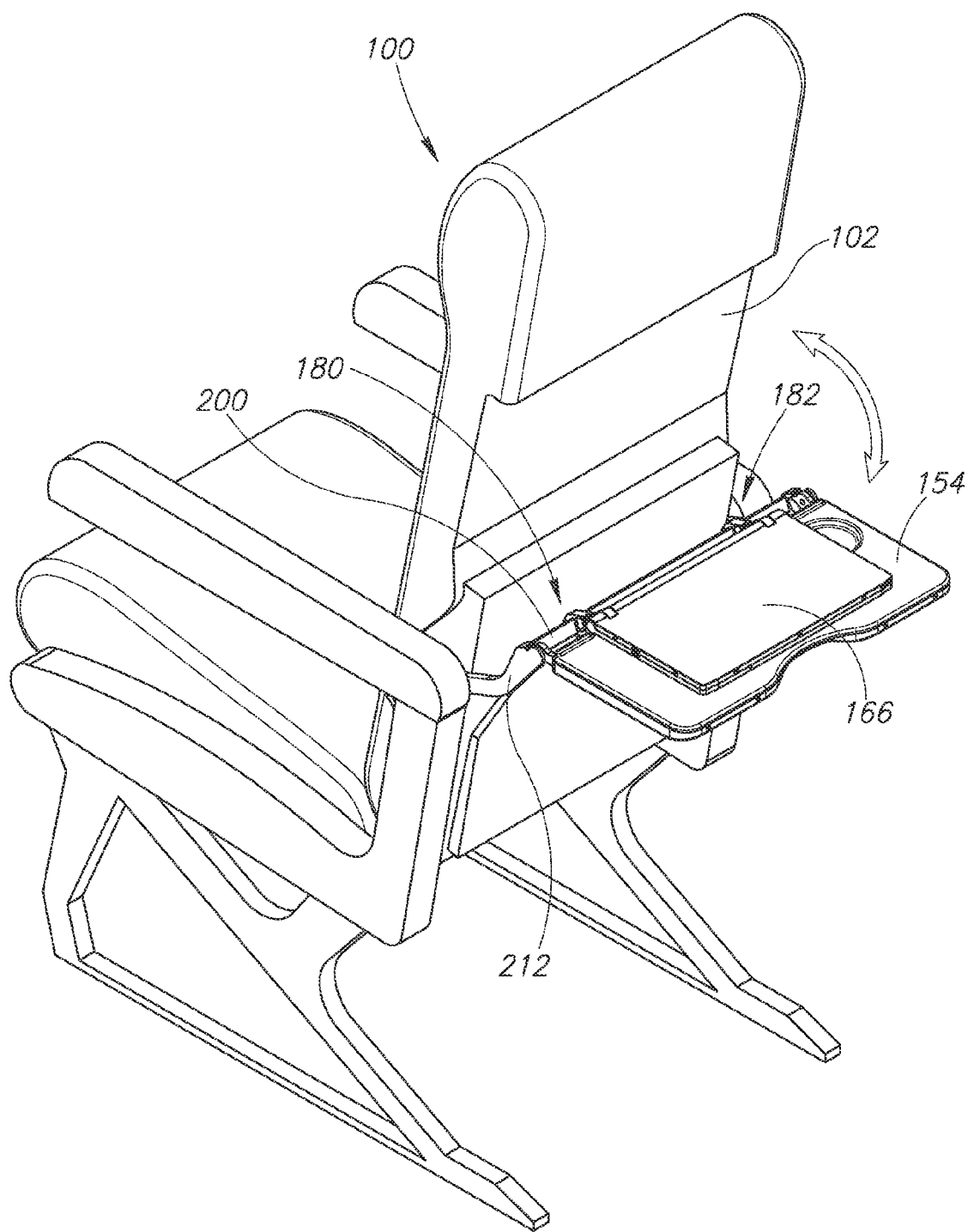
FIG. 11 is a front perspective view of the IFE system of FIG. 8 shown in a position between the fully deployed, closed position with a display device adjacent a lowered tray table.

As can be appreciated, the left link arm assembly 180 and the right link arm assembly 182 allow the display carrier 166 to pivot around two distinct axes D and E (see FIGS. 9 and 10B). This gives a user significant freedom to control the height, forward/rearward position, and tilt of the display device 176. The connection points for the left and right link arm assemblies 180 and 182 may be in the form of friction hinges operative to maintain the relative position of the object they are connecting under the static weight of the object and when a force is not applied by a user. These types of hinges may also be referred to as torque hinges, position hinges, or detent hinges. It should be appreciated that various types of suitable hinges may be used.

By coupling the display carrier 166 to the crossbar 200 using the left and right link arm assemblies 180 and 182, the positioning of the display carrier and tray 154 may be adjusted by a user in a plurality of ways. In general, the IFE system 150 may be moved into a stowed position (see FIG. 12) wherein it is positioned substantially vertical between the tray table 154 and the back 102 of the seat 100 and the display 176 is viewable through an opening 162 in the tray table 154. The IFE system 150 may also be moved into a deployed position (see FIG. 8) wherein the display carrier 166 is positioned so that a user may view and operate the display device 206 when the tray table 154 is in the deployed position. As shown in FIG. 10B, a user may adjust the height and forward/rearward positioning of the display carrier 166 by selectively applying a force to it to cause the carrier to rotate about the axis D. The user may also adjust the viewing angle or tilt of the display carrier 166 (and therefore the display 176) by applying a force to the display carrier to cause it to rotate relative to the link arm assemblies 180 and 182 about the axis E. Thus, the user has a significant degree of control over the positioning of the display carrier 166, which allows the user to position the display 176 at a desirable height, distance, and angle. In some embodiments, the display carrier 166 is configured to allow a user to rotate it about a vertical axis so that the case may be slanted or panned to the left and right, which may be advantageous when multiple users wish to view the display 176 simultaneously.

The link arm assemblies 180 and 182 may be configured to limit the rotation of the display carrier 166 relative to the crossbar 200. As an example, in some embodiments the display carrier 166 may be tilted away from the user by only a predetermined amount (e.g., 10-20 degrees from a vertical position). This feature may prevent the display carrier 166 from being moved into positions by the user that could cause damage to the IFE system 150 or could prevent the system from being easily moved between the stowed position and the deployed position.

In some embodiments, a panel 178 formed from a transparent material is disposed within the opening 159 of the tray table 154 to form a transparent portion of the tray table. When the IFE system 150 is in the upright or stowed position (see FIG. 12), the touch screen display device 176 is viewable through the opening 159 of the tray table 154. In some embodiments, the panel 178 may comprises a display device (e.g., a touch screen type display device) that allows a user view media on the panel when the IFE system 150 is in the stowed position.

In another embodiment shown in FIGS. 14-18E, the invention comprises a portable IFE system 350 that is releasably couplable to an edge of a table 500, such as a tray table of an aircraft, train, or the like or any other table or item. Similar to previously described embodiments, the portable IFE system 350 includes self-contained audiovisual presentations. The IFE system 350 comprises a display device 366 having internal storage configured to contain current releases of movies and other audiovisual presentations. As an example, the display device 366 of the IFE system 350 may comprise a tablet computer configured with a touch screen that is housed inside a display carrier 354 having a front portion 358 and a back portion 359 (see FIG. 15). In some embodiments, the display device 366 is simply a "dumb" or thin client that receives content from a remotely located computer/server.

In some embodiments, the self-contained portable IFE system 350 may be rented by passengers of commercial airline flights (or other transportation systems) for viewing of such movies and other audiovisual presentations during a flight. Use of the IFE system 350 provides a selection of audiovisual presentations from which the passengers renting it can choose. This individualizes the selection opportunity provided to each passenger by the IFE system 350 and increases the potential for enjoyment by the passengers compared with conventional systems that display one audiovisual presentation to a large group of passengers with the passengers having no input on the particular audiovisual property being presented. The IFE system 350 may also be purchased and used for personal or business usage where it is desirable to have a support for a tablet computer.

Figure 14:
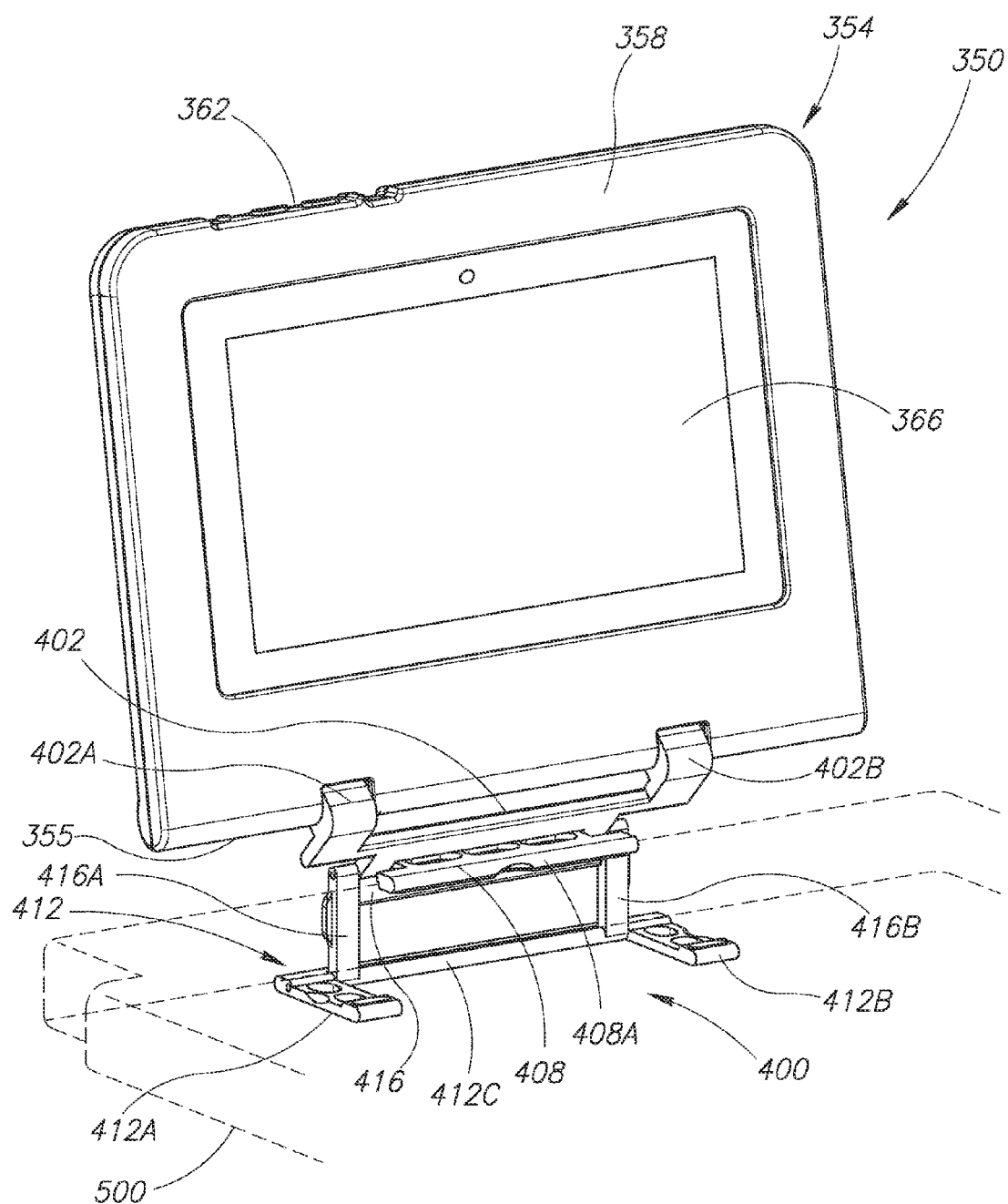
FIG. 14 illustrates a front perspective view of an embodiment of a portable IFE system when releasably coupled to a tray table.
Figure 16:
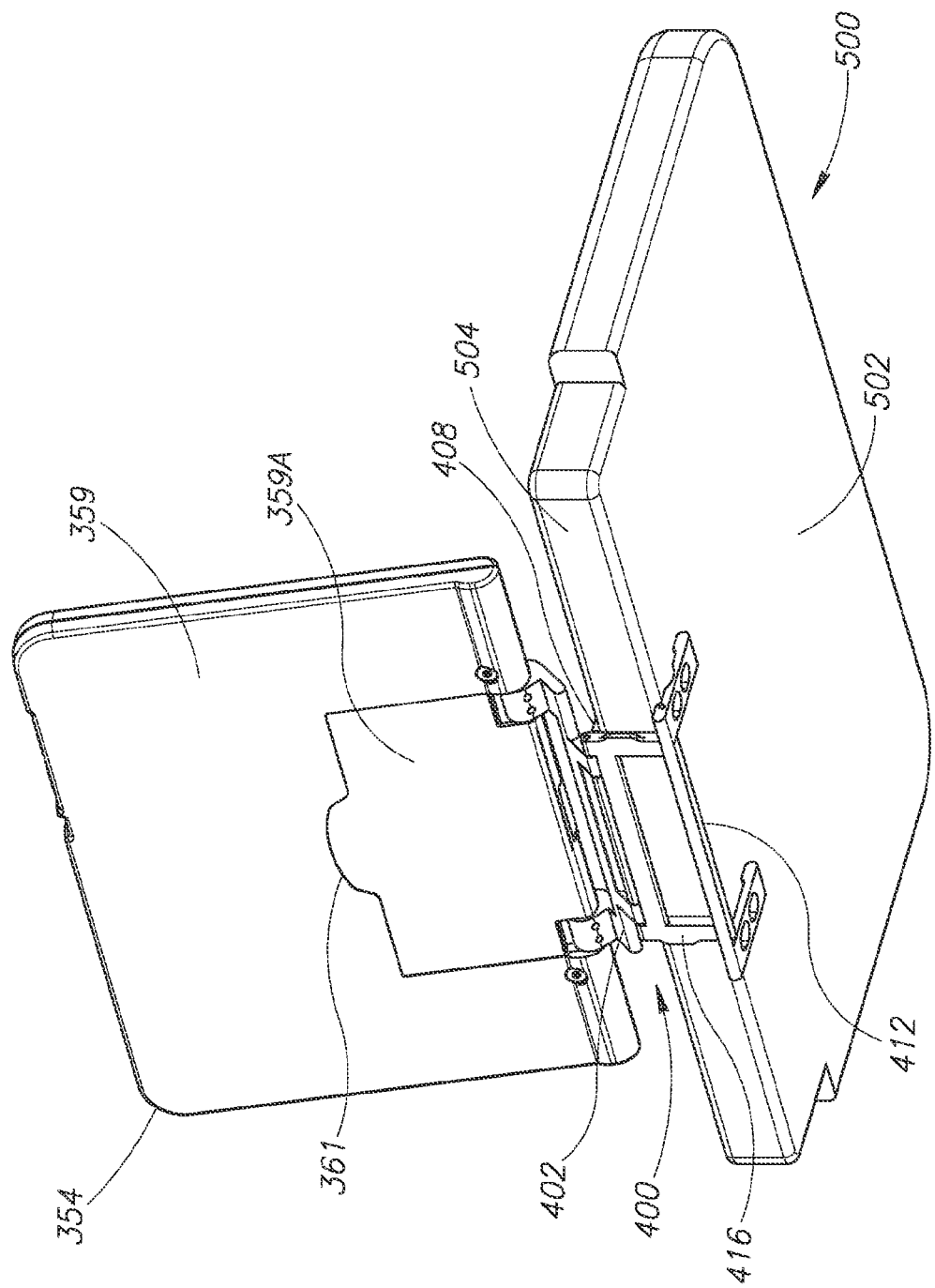
FIG. 16 illustrates a back perspective view of the portable IFE system of FIG. 14 when coupled to the tray table.
Figure 17A:
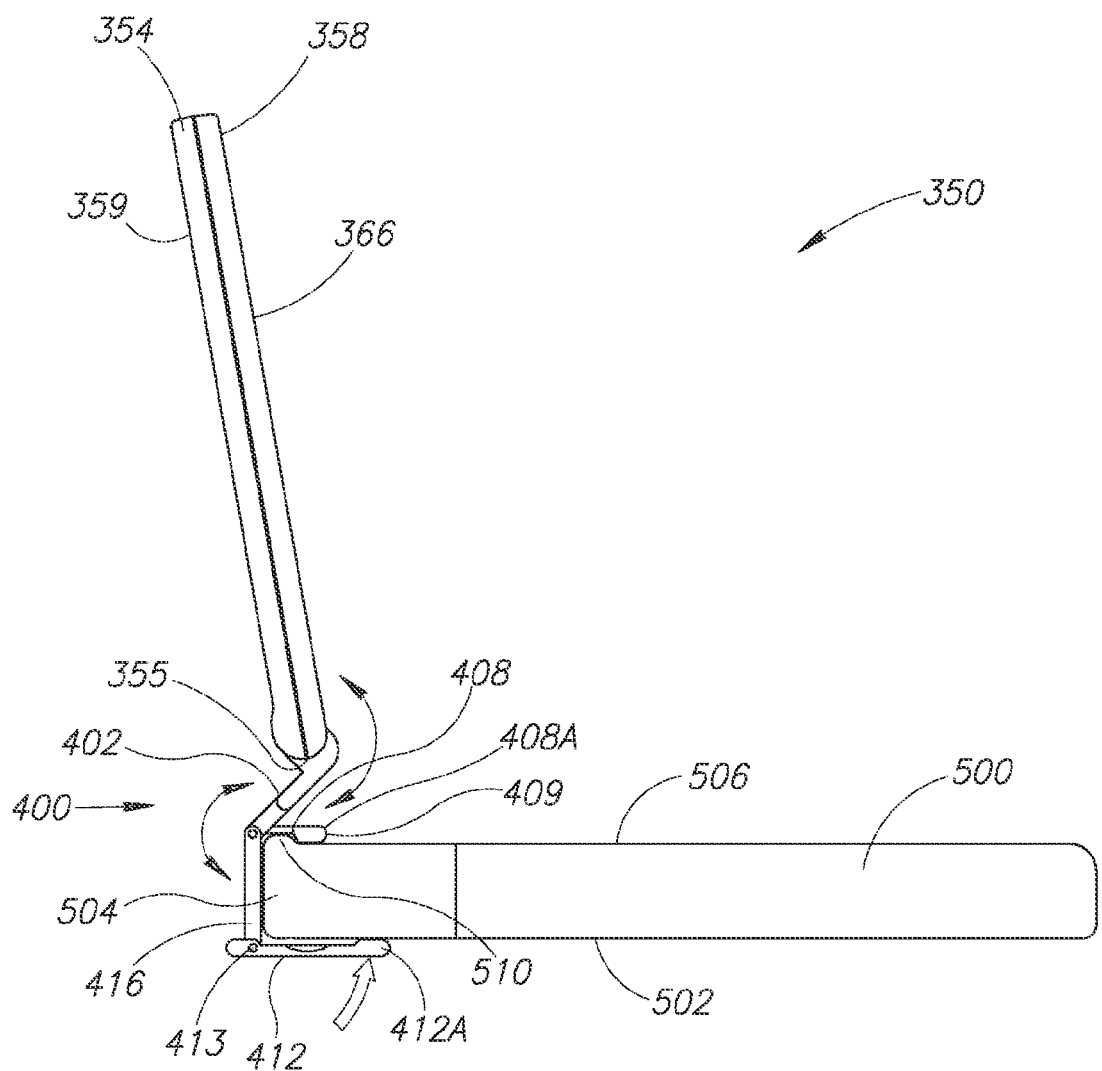
FIG. 17A illustrates a left side elevational view of the portable IFE system of FIG. 14 when coupled to the tray table.

As shown in FIGS. 14, 16, and 17A, a passenger while seated in aircraft seat can view a movie being presented by the portable IFE system 350 when it is releasably coupled to a distal edge 504 (see FIGS. 16 and 17A) of the conventional seat-back tray table 500 that is connected to a forwardly adjacent aircraft seat (not shown). To accomplish this, the IFE system 350 includes a foldable table clamp 400 pivotably attached to a lower portion 355 of the display carrier 354. The operation of the foldable table clamp 400 is described below. The display carrier 354 may comprise an audio input port and controls 362 configured to allow earphones to be used to listen to the audio portion of the presentation without disturbing fellow passengers, and for selection of presentations and adjustment of the portable IFE system 350. As discussed above, the display device 366 may utilize a touch screen interface for input as well.

In use, the portable IFE system 350 may be reserved as part of a flight reservation done by telephone, Internet access, at a travel agency, or by other means used for reserving and booking commercial aircraft flights (or other means of transportation). The IFE system 350 may then be picked up by the passenger at a pickup location. In some implementations, these pickup locations are typically configured to store a number of the portable IFE systems so that they may be rented by numerous passengers of one or more flights. Depending upon implementation, the pickup location could be at various areas in an airport or on the aircraft. Additionally, the IFE systems could be handed out by flight attendants (e.g., using a cart) after passengers are seated.

Before or during a flight, the passenger then clamps the foldable clamp 400 onto the distal edge 504 (i.e., away from the passenger), a forward edge, or any other edge, of the passenger's table 500 and uses the portable IFE system 350 as previously discussed to view and/or listen to audio or audiovisual content. After completion of use, the passenger may return the IFE system 350 to a drop-off point or may leave the IFE system in place so that an airline employee may come by and pick it up.

Figure 15:
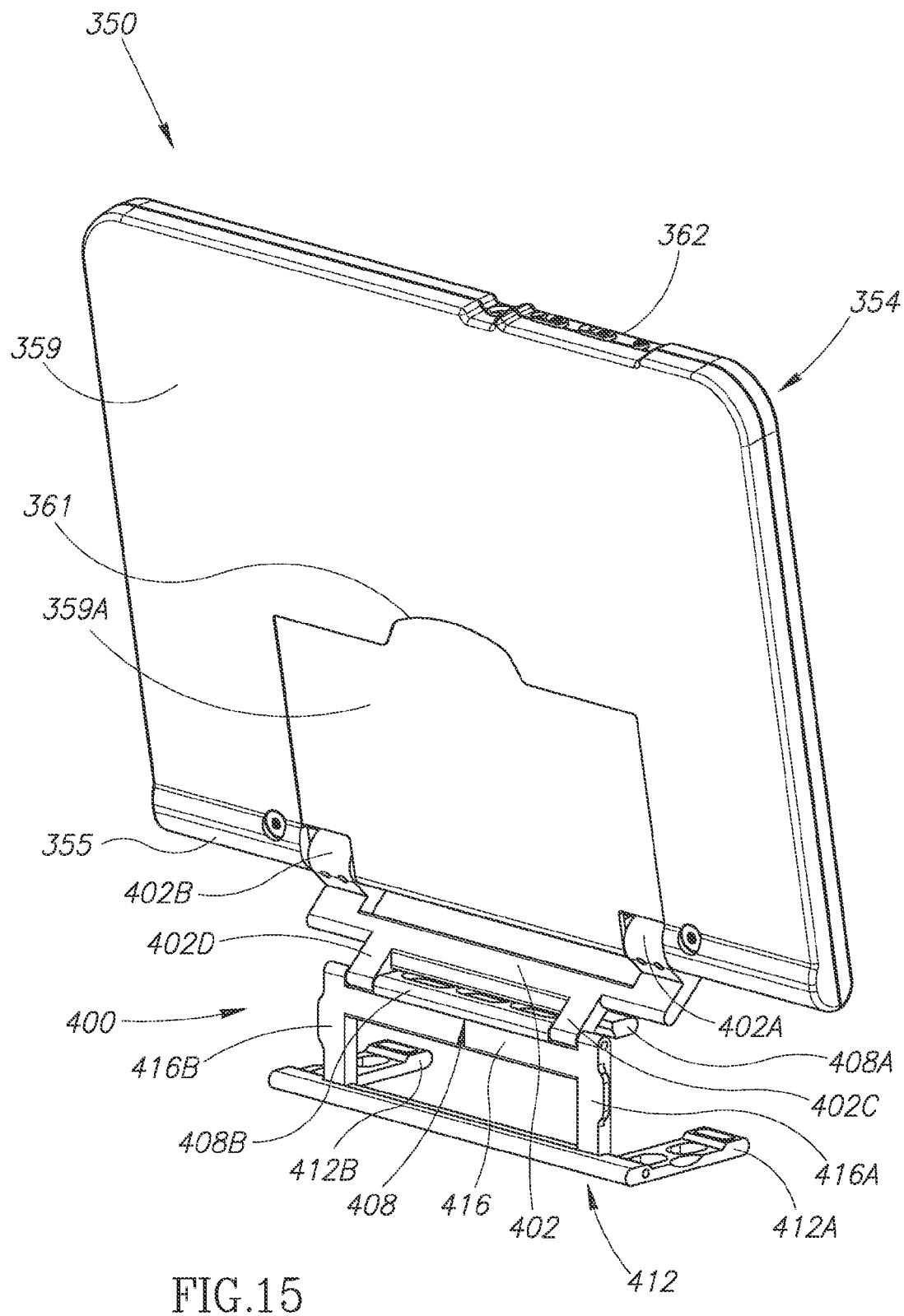
FIG. 15 illustrates a back perspective view of the portable IFE system of FIG. 14 when removed from the tray table.

FIGS. 14 and 15 illustrate front and back views, respectively, of the IFE system 350 when the clamp 400 is in the extended or use position. As shown, the table clamp 400 comprises four rigid components 402, 408, 412, and 416 hingedly connected to each other. Specifically, the clamp 400 comprises a lower clamp portion 412 having two forward portions 412A and 412B extending horizontally forward from a rearward portion 412C. The rearward portion 412C of the lower clamp portion 412 is coupled to a rearward portion 408B (see FIG. 15) of an upper clamp portion 408 by a vertical clamp spacer portion 416. The vertical spacer portion 416 includes left and right vertical portions 416A and 416B, respectively, operative to hingedly couple the vertical spacer portion both to the rearward portion 412C of the lower clamp portion 412 and to the rearward portion 408B of the upper clamp portion 408.

The clamp 400 also comprises a display coupling portion 402 hingedly coupling the lower portion 355 of the display carrier 354 to an upper end of the vertical spacer portion 416. In particular, the display coupling portion 402 comprises a first pair of spaced apart hinge portions 402A and 402B operative to hingedly couple the table clamp 400 to the lower portion 355 of the display carrier 354, and a second pair of spaced apart hinge portions 402C and 402D operative to hingedly couple the display coupling portion 402 to the vertical spacer portion 416.

Figure 17B:
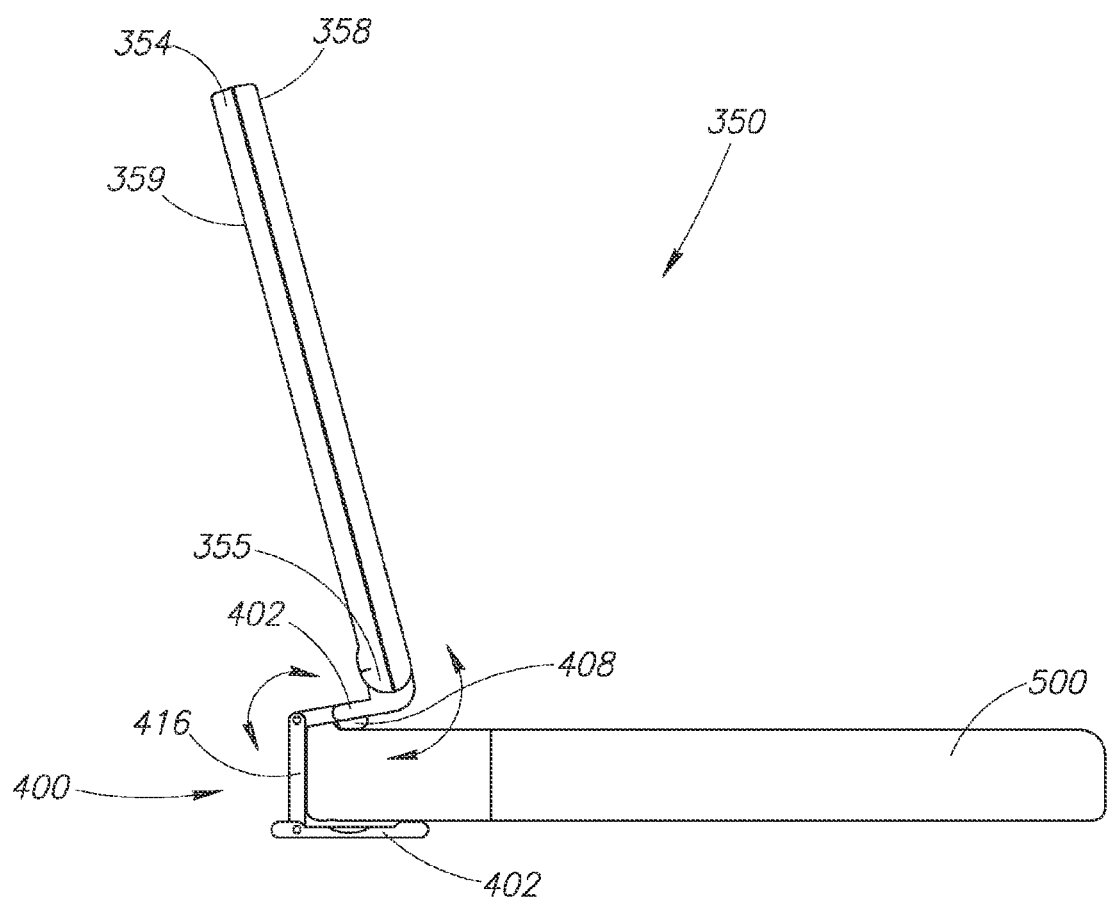
FIG. 17B illustrates a left side elevational view of the portable IFE system of FIG. 14 when coupled to the tray table and when the display device is tilted in a rearward direction.
Figure 17C:
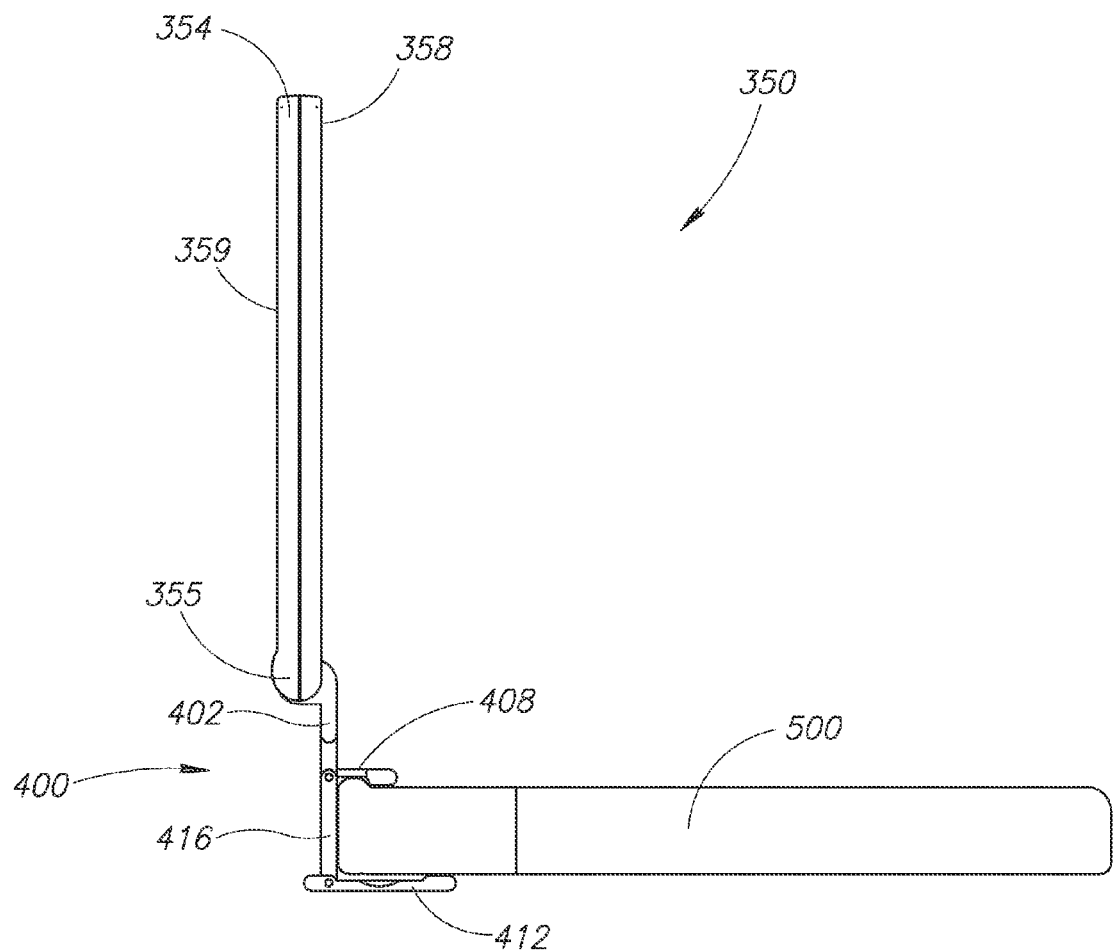
FIG. 17C illustrates a left side elevational view of the portable IFE system of FIG. 14 when coupled to the tray table and a foldable clamp is configured to provide a maximum height for the display device of the portable IFE system.

Since the display coupling portion 402 is hingedly coupled to both the display carrier 354 and the vertical spacer portion 416, the positioning of the display carrier 354 (including the display device 366) is selectively adjustable by a user. For example, a user may selectively adjust the height, forward/rearward position, and tilt of the display device 366 relative to the table 500 by grasping the display carrier 354 and moving it to a desired position. This feature is illustrated in FIGS. 17A, 17B, and 17C, which show left side views of the IFE system 350. In FIG. 17A, the display carrier 354 is slightly tilted (via the hinge connecting the display coupling portion 402 and the display carrier) and it is configured so that the height of the display device 366 is partially raised (via the hinge connecting the display coupling portion 402 and the vertical spacing portion 416). In FIG. 17B, the display carrier 354 is tilted more rearward and its height is lower than the height shown in FIG. 17A. As well, the display carrier 354 is moved rearward toward the passenger. In FIG. 17C, the display carrier 354 is disposed in a substantially vertical position and it is at its full height (i.e., the display coupling portion 402 and the vertical spacer portion 416 are vertically aligned). It should be appreciated that the display carrier 354 may be moved and tilted into a variety of positions.

The various hinges of the foldable clamp 400 may be friction hinges operative to maintain the relative position of the objects they are connecting when a force is not applied by a user. These types of hinges may also be referred to as torque hinges, position hinges, or detent hinges. It should be appreciated that various types of suitable hinges may be used which allow adjusting movement but hold the IFE system 350 in the position to which moved during normal usage.

Moreover, as discussed above, the table clamp 400 is foldable between the extended or use position (see e.g., FIGS. 14 and 15) and a stowed position (see FIG. 18E) wherein it is disposed adjacent the display carrier 354 on the back surface 359 thereof opposite the display 366. This feature allows the IFE system 350 to be efficiently stored and carried, which is important in transportation applications where space is often limited.

Figure 18A:
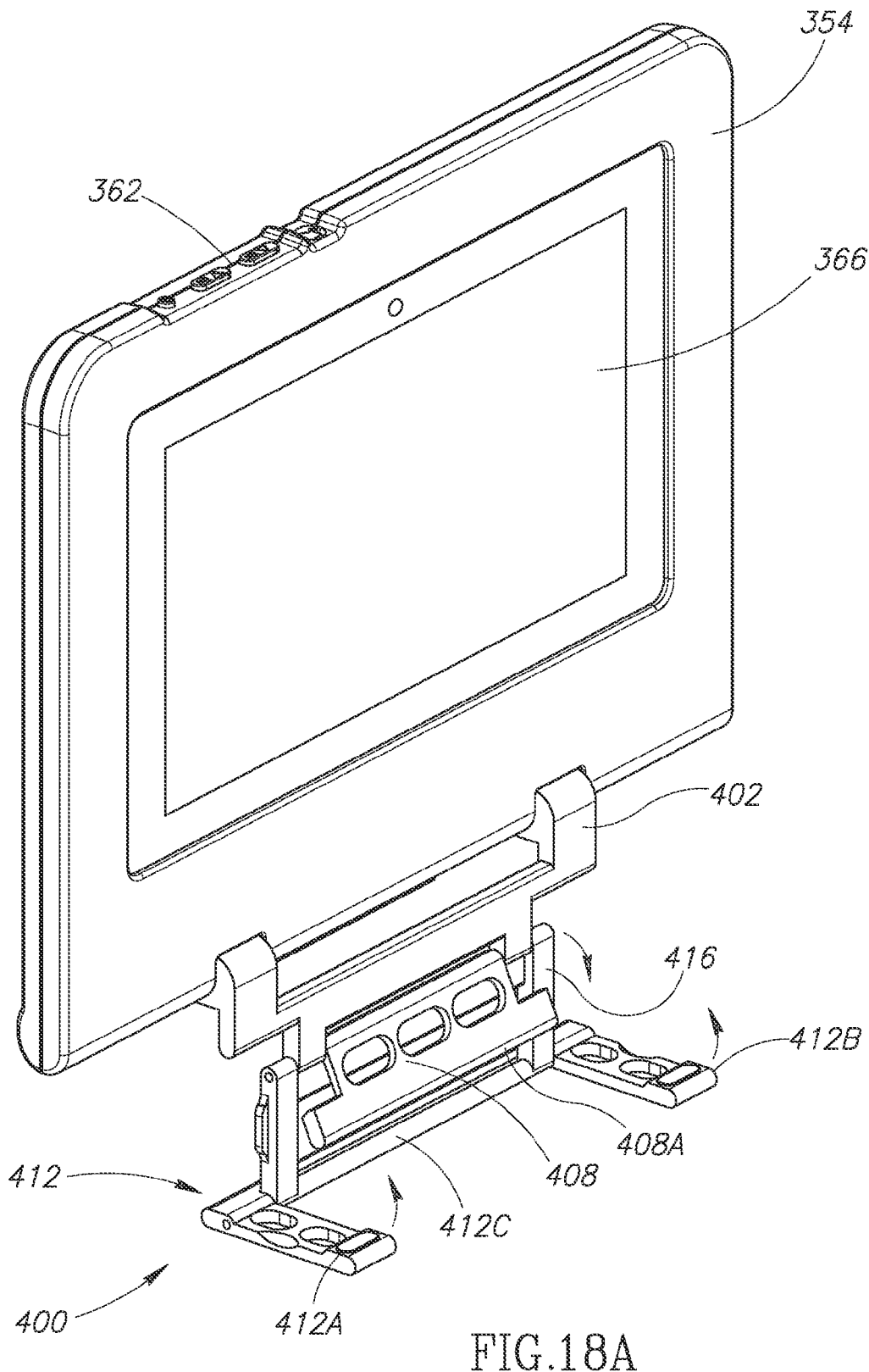
FIG. 18A illustrates a front perspective view of the IFE system of FIG. 14 during a first step of a folding process.
Figure 18B:
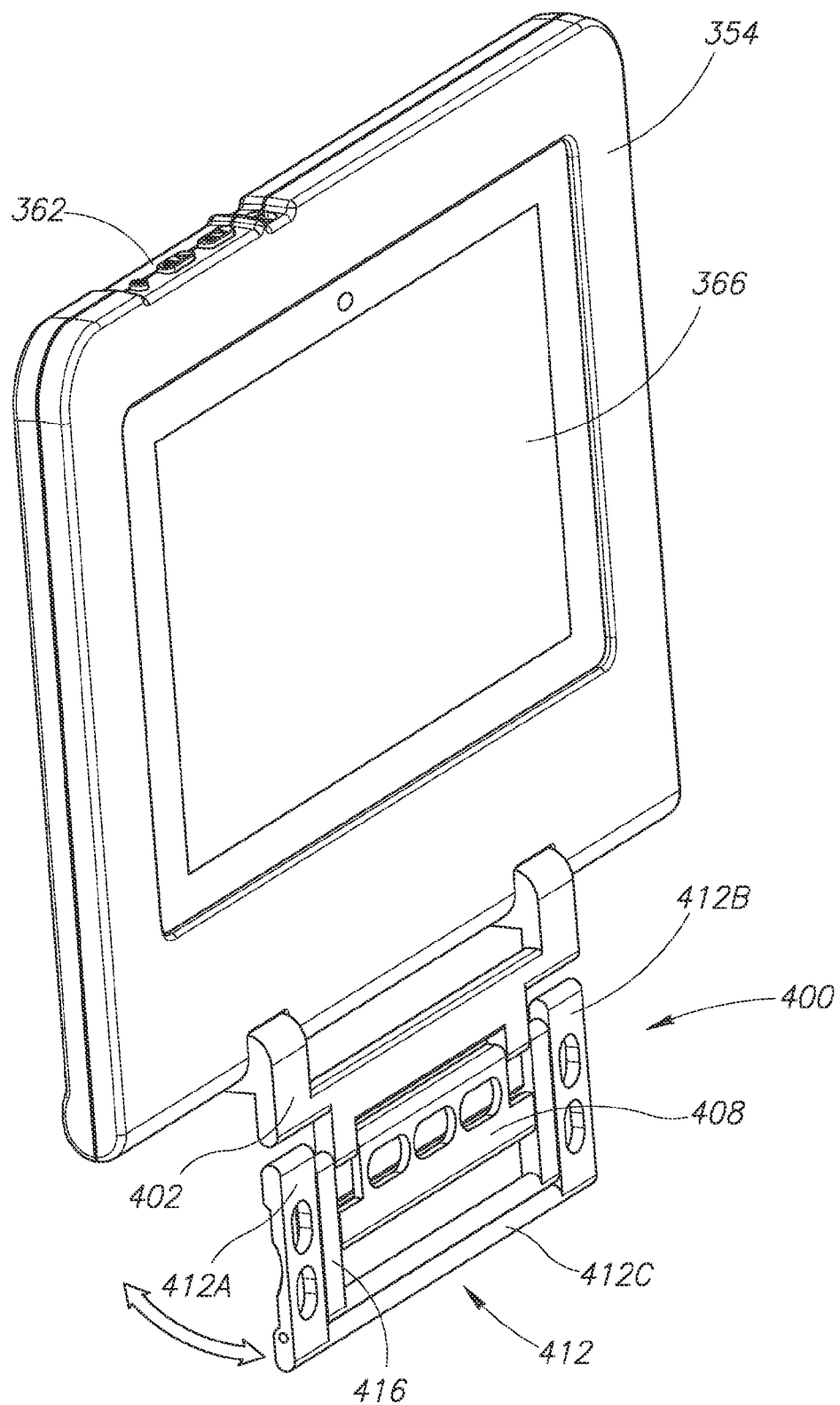
FIG. 18B illustrates front perspective view of the IFE system of FIG. 14 after a second step of the folding process.
Figure 18C:
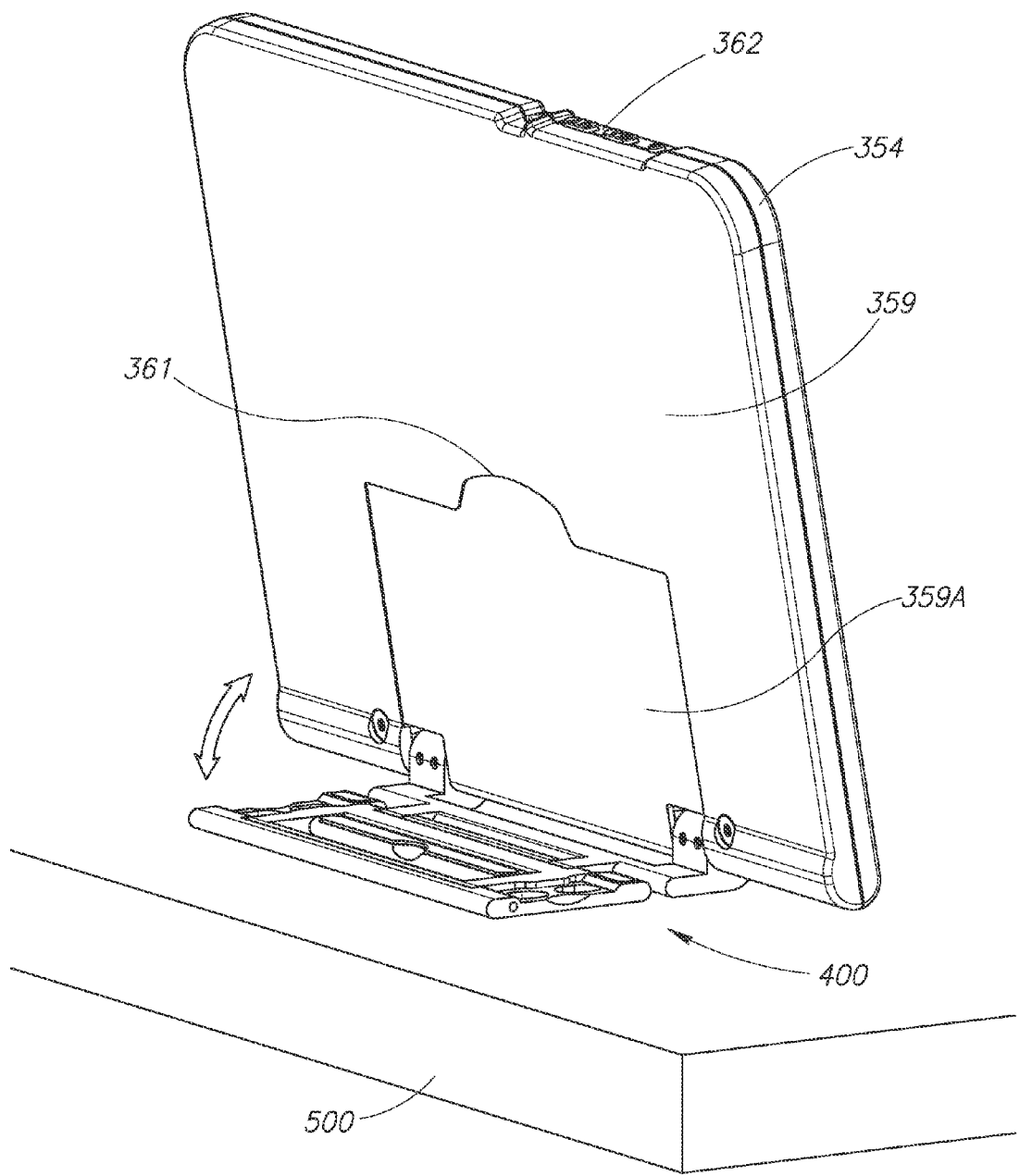
FIG. 18C illustrates back perspective view of the IFE system of FIG. 14 after a third step of the folding process, wherein the foldable clamp may be used to support the display device on a horizontal surface.
Figure 18D:
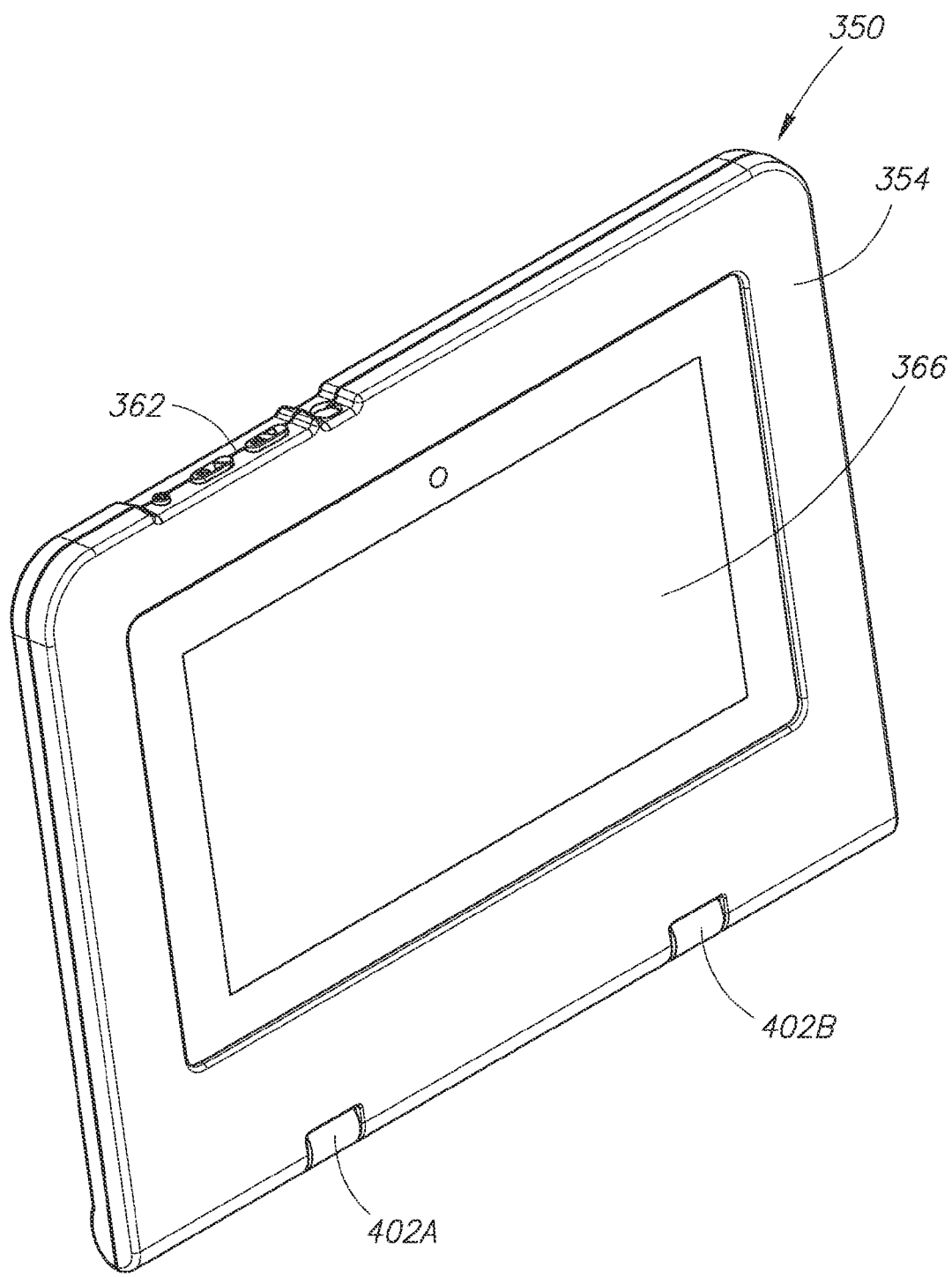
FIG. 18D illustrates front perspective view of the IFE system of FIG. 14 after a fourth and final step of the folding process.
Figure 18E:
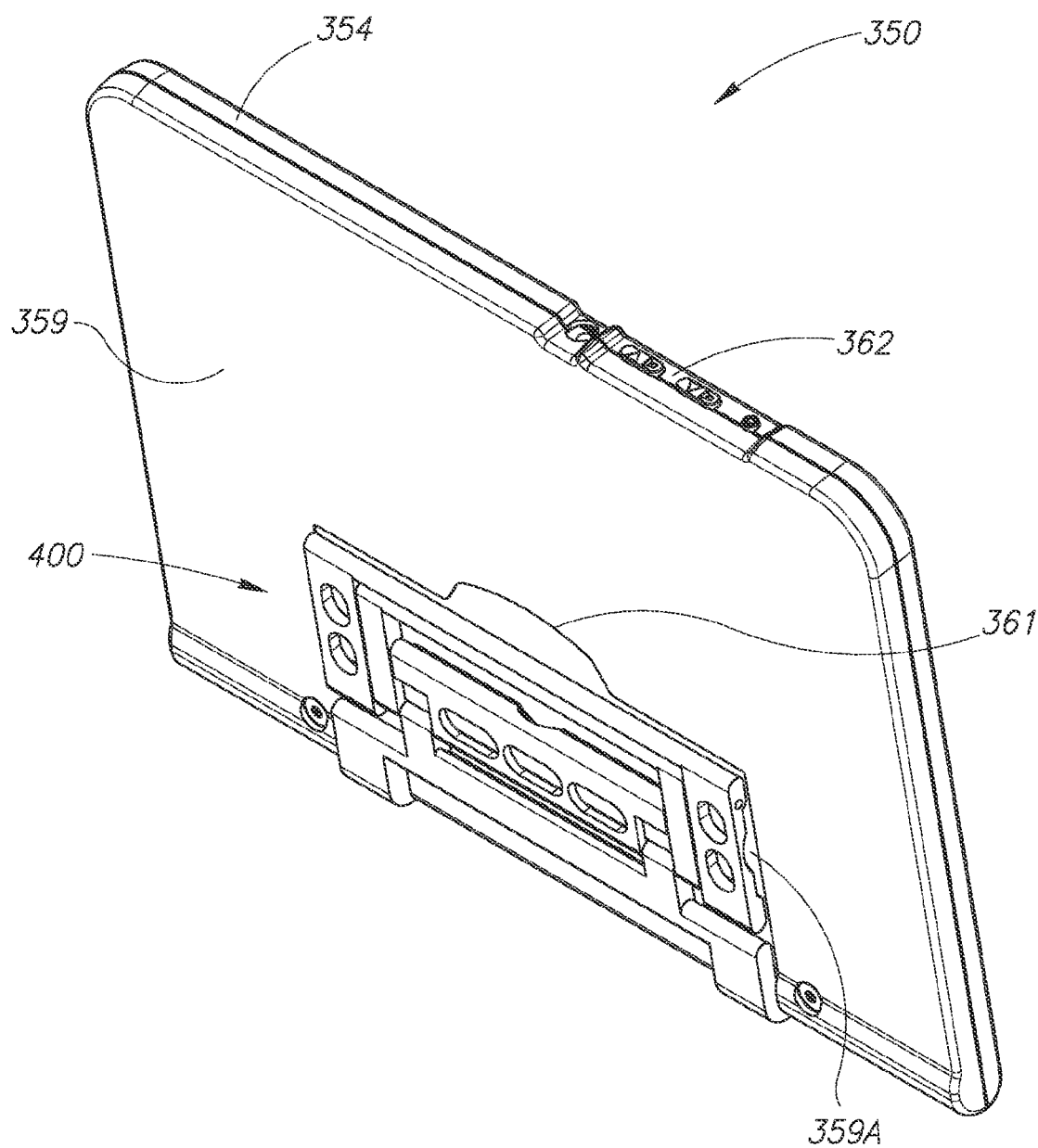
FIG. 18E illustrates back perspective view of the IFE system of FIG. 14 after the fourth and final step of the folding process.

The steps for moving the table clamp 400 between the extended or use position and the stowed position are illustrated by FIGS. 18A-18E. As shown in FIGS. 18A and 18B, the top clamp portion 408 may be folded downward and the bottom clamp portion 412 may be folded upward so that they are disposed in substantially the same plane as the vertical spacer portion 416 and the display coupling portion 402. This configuration is shown in FIG. 18B. Next, as shown in FIG. 18C, the display coupling portion 402 may be rotated backward (toward the back surface 359) about the hinge connecting it and the display carrier 354. FIG. 18C illustrates the IFE system 350 when in this position, wherein the foldable clamp 400 is disposed partway between the extended position (FIG. 18B) and the stowed position (FIG. 18E) and may be used as a self-supporting stand for the IFE system when in this position. As shown in FIGS. 18D and 18E, the display coupling portion 402 may be further rotated until the foldable clamp 400 is in the stowed position wherein it is disposed adjacent the back surface 359 within a recessed portion 359A. The recessed portion 359A is shaped to be slightly larger than the clamp 400 and includes a recessed grasping portion 361 that makes it easy for a user to grasp the foldable clamp 400 when moving it from the stowed position to the extended position.

When the clamp 400 is in the stowed position shown in FIGS. 18D and 18E, the IFE system 350 occupies a relatively small volume of space, which makes transporting and storing multiple IFE systems more efficient. Further, in some embodiments, one or more of the hinges and/or one or more of the components of the foldable clamp 400 are configured to snap or releasably lock together such that the foldable clamp is retained in the stowed position until a force sufficient to overcome the "lock" is applied to the clamp. As can be appreciated, this feature may prevent the foldable clamp 400 from being unintentionally moved out of the stowed position.

As shown in FIG. 17A, in some embodiments the forward portions 412A and 412B of the lower clamp portion 412 may be biased upward (e.g., loaded by a spring 413) such that the clamp 400 grabs or clamps a top surface 506 and a bottom surface 502 of the tray table 500. Further, the forward portion 408A of the top clamp portion 408 may include a downwardly projecting portion 409 that operates to form a notch or groove that receives an upwardly projecting rail or edge 510 extending across the distal edge 504 of the tray table 500. The downwardly projecting portion 409 may operate to limit the forward/rearward movement of the clamp 400 by engaging the upwardly projecting edge 510 of the tray table 500, thereby maintaining the coupling of the clamp 400 to the table 500. Additionally, to increase the friction between the clamp 400 and the tray table 500 and to prevent potential damage or wear to the tray table, a portion of the top surfaces of the forward portions 412A and 412B of the lower clamp portion 412 and the bottom surface of the downward projecting portion 409 of the forward portion 408A may be covered with a friction-enhancing material or padding material, such as rubber or any other suitable material.

By physically integrating a touch screen display device and a tray table, IFE systems of the present invention offer an ergonomic, lightweight, and easily maintainable solution for providing airline passengers with a satisfying entertainment experience during their flights. Those skilled in the art will readily recognize these and other advantages presented by the embodiments of the invention described herein.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. An entertainment system configured for coupling with a horizontally extending support member, the entertainment system comprising:
    a display device pivotably coupled to the horizontally extending support member and having a front side and a back side;
    a tray table having an outer surface and an inner surface and being configured for pivotable movement between a substantially vertical stowed position and a substantially horizontal deployed position, wherein the display device is pivotable relative to the tray table between a closed position wherein the inner surface of the tray table and the front side of the display device are substantially adjacent to each other and an open position wherein the inner surface of the tray table and the front side of the display device are spaced apart from each other, the inner surface of the tray table being configured for use as a table top when the display device is in the open position and the tray table is in the deployed position; and
    a link arm pivotably coupled to the display device for relative rotation between the link arm and the display device about a first horizontal axis of rotation positioned above the tray table and pivotably coupled to the horizontally extending support member for relative rotation between the link arm and the horizontally extending support member about a second horizontal axis of rotation spaced apart from the first horizontal axis of rotation to permit multiple horizontal axes of pivotable movement of the display device relative to the tray table when the display device is in the open position and the tray table is in the deployed position, the link arm including spaced apart first and second end portions, the first end portion being pivotably coupled to the display device at a position above the tray table and the second end portion being pivotably coupled to the horizontally extending support member to provide pivotal movement of the display device relative to the tray table when the display device is in the open position and the tray table is in the deployed position about two spaced apart horizontal axes, with rotation of the display device relative to the link arm about the first horizontal axis of rotation permitting adjustment of the inclination of the display device relative to the tray table when the display device is in the open position and the tray table is in the deployed position, and with rotation of the link arm relative to the horizontally extending support member about the second horizontal axis of rotation permitting adjustment of the rearward position of the display device relative to the tray table when the display device is in the open position and the tray table is in the deployed position.

2. The entertainment system of claim 1, wherein the tray table includes a window portion aligned with the display device so that the display device is viewable through the window portion when the display device is in the closed position and the tray table is in the stowed position.

3. The entertainment system of claim 1, wherein the tray table comprises a laterally extending horizontal channel for receiving the horizontally extending support member therethrough, the tray table also comprising a slot configured to expose at least a portion of the horizontally extending support member and sized to receive the link arm and permit pivotable movement of the link arm therein as the display device is pivotably moved relative to the tray table when the display device is in the open position and the tray table is in the deployed position.

4. The entertainment system of claim 1, further including a pivot arm mount non-rotatably attached to the horizontally extending support member, and wherein the link arm is pivotably couple the horizontally extending support member by being pivotably coupled to the pivot arm mount.

5. The entertainment system of claim 1 for use with a passenger seat and with the left and right laterally spaced apart support members at a rearward side of the passenger seat, each having a lower end portion pivotally attached to the passenger seat for rotation about a horizontal axis of rotation and an upper end portion, further comprising the display device and the tray table being supported by the left and right laterally spaced apart support members and thereby the display device and the tray table are pivotably coupled to a portion of the passenger seat for rotation as a unit about the horizontal axis of rotation.

6. The entertainment system of claim 5 for use with left and right laterally spaced apart guide members, wherein the tray table includes left and right laterally spaced apart elongated slots slidably receiving the left and right guide members, respectively, to permit the tray table to be moved in a rearward direction away from the horizontally extending support member when the display device is in the open position and the tray table is in the deployed position.

7. The entertainment system of claim 1, wherein the tray table is pivotably coupled to the horizontally extending support member.

8. The entertainment system of claim 1 for use with a passenger seat and with left and right laterally spaced apart support members at a rearward side of the passenger seat, each having a lower end portion pivotally attached to the passenger seat and an upper end portion, wherein the tray table is pivotably coupled to the upper end portions of the left and right laterally spaced apart support members and thereby is pivotably coupled to a portion of the passenger seat.

9. An entertainment system configured for coupling with a horizontally extending support member, the entertainment system comprising:
   a display device pivotably coupled to the horizontally extending support member and having a front side and a back side;
   a tray table having an outer surface and an inner surface and being configured for pivotable movement between a substantially vertical stowed position and a substantially horizontal deployed position, wherein the display device is pivotable relative to the tray table between a closed position wherein the inner surface of the tray table and the front side of the display device are substantially adjacent to each other and an open position wherein the inner surface of the tray table and the front side of the display device are spaced apart from each other, the inner surface of the tray table being configured for use as a table top when the display device is in the open position and the tray table is in the deployed position; and
   a first link member and a second link member laterally spaced apart from the first link member, the first link member comprising spaced apart first and second portions, the first portion being pivotably coupled to the display device for relative rotation between the first link member and the display device about a first horizontal axis of rotation positioned above the tray table and the second portion being pivotably coupled to the horizontally extending support member for relative rotation between the first link member and the horizontally extending support member about a second horizontal axis of rotation spaced apart from the first horizontal axis of rotation, and the second link member comprising spaced apart first and second portions, the first portion being pivotably coupled to the display device for relative rotation between the second link member and the display device about the first horizontal axis of rotation positioned above the tray table and the second portion being pivotably coupled to the horizontally extending support member for relative rotation between the second link member and the horizontally extending support member about the second horizontal axis of rotation, to permit multiple horizontal axes of pivotable movement of the display device relative to the tray table when the display device is in the open position and the tray table is in the deployed position, the first portion and the second portion of each of the link members being pivotable relative to the display device and the horizontally extending support member, respectively, to provide independent pivotal movement of the display device relative to the tray table when the display device is in the open position and the tray table is in the deployed position about two spaced apart horizontal axes with rotation of the display device relative to the link members about the first horizontal axis of rotation permitting adjustment of the inclination of the display device relative to the tray table when the display device is in the open position and the tray table is in the deployed position, and with rotation of the link members relative to the horizontally extending support member about the second horizontal axis of rotation permitting adjustment of the rearward position of the display device relative to the tray table when the display device is in the open position and the tray table is in the deployed position.

10. The entertainment system of claim 9, further including first and second pivot member mounts non-rotatably attached to the horizontally extending support member, and wherein the second portion of the first link member is pivotably coupled to the horizontally extending support member by being pivotably coupled to the first pivot member mount and the second portion of the second link member is pivotably coupled to the horizontally extending support member by being pivotably coupled to the second pivot member mount.

11. The entertainment system of claim 10, wherein the tray table is pivotably coupled to the horizontally extending support member.

12. An entertainment system for use with a passenger seat, the entertainment system comprising:
   first and second spaced apart support arms configured for coupling with the passenger seat;
   a horizontally extending support member disposed between and supported by the first and second support arms;
   a tray table having an outer surface and an inner surface and being configured for movement between a substantially vertical stowed position and a substantially horizontal deployed position;
   a display device having a front side and a back side, the display device being pivotable relative to the tray table between a closed position wherein the inner surface of the tray table and the front side of the display device are substantially adjacent to each other when the tray table is in the stowed position and an open position wherein the inner surface of the tray table and the front side of the display device are spaced apart from each other when the tray table is in the deployed position, the inner surface of the tray table being configured for use as a table top when the display device is in the open position and the tray table is in the deployed position; and
   laterally spaced apart first and second link members supporting the display device, the first link member comprising spaced apart first and second portions, the first portion being pivotably coupled to the display device for relative rotation between the first link member and the display device about a first horizontal axis of rotation positioned above the tray table and the second portion being pivotably coupled to the horizontally extending support member for relative rotation between the first link member and the horizontally extending support member about a second horizontal axis of rotation spaced apart from the first horizontal axis of rotation, and the second link member comprising spaced apart first and second portions, the first portion being pivotably coupled to the display device for relative rotation between the second link member and the display device about the first horizontal axis of rotation positioned above the tray table and the second portion being pivotably coupled to the horizontally extending support member for relative rotation between the second link member and the horizontally extending support member about the second horizontal axis of rotation, the display device being rotatable about the first horizontal axis of rotation relative to the first portions of the first and second link members when the display device is in the open position and the tray table is in the deployed position, independent of rotation of the second portions of the first and second link members relative to the horizontally extending support member about the second horizontal axis of rotation, to permit adjustment of the inclination of the display device relative to the tray table when the display device is in the open position and the tray table is in the deployed position, and the second portions of the first and second link members being rotatable relative to the horizontally extending support member when the display device is in the open position and the tray table is in the deployed position, independent of rotation of the display device relative to the first portions of the first and second link members about the first horizontal axis of rotation, to permit adjustment of the rearward position of the display device relative to the tray table when the display device is in the open position and the tray table is in the deployed position, the first and second link members further permitting pivotal movement of the display device relative to the tray table between the closed position wherein the inner surface of the tray table and the front side of the display device are substantially adjacent to each other when the tray table is in the stowed position and the open position wherein the inner surface of the tray table and the front side of the display device are spaced apart from each other when the tray table is in the deployed position.

13. The entertainment system of claim 12, wherein the tray table includes a window portion aligned with the display device so that the display device is viewable through the window portion when the display device is in the closed position and the tray table is in the stowed position.

14. The entertainment system of claim 12, wherein the tray table comprises a horizontally extending channel for receiving the horizontally extending support member therethrough, the tray table also comprising laterally spaced apart first and second slots configured to expose at least laterally spaced apart first and second portions of the horizontally extending support member, the first slot being sized to receive the first link member and the second slot being sized to receive the second link member and permit pivotable movement of the first and second link member within the first and second slots, respectively, as the display device is pivotably moved relative to the tray table when the display device is in the open position and the tray table is in the deployed position.

15. The entertainment system of claim 12, wherein the tray table is pivotably coupled to the horizontally extending support member.

16. The entertainment system of claim 12, further including laterally spaced apart first and second pivot member mounts non-rotatably attached to the horizontally extending support member, and wherein the second portion of the first link member is pivotably coupled to the horizontally extending support member by being pivotably coupled to the first pivot member mount and the second portion of the second link member is pivotably coupled to the horizontally extending support member by being pivotably coupled to the second pivot member mount.

17. The entertainment system of claim 12 for use by a user, wherein the display device is selectively rotatable by the user about the first horizontal axis of rotation relative to the first portions of the first and second link members between a fully forward inclination of the display device relative to the tray table and a fully rearward inclination of the display device relative to the tray table, and at least one inclination therebetween, with the first portions of the first and second link members rotatably coupled to the display device to retain the display device in the user selected inclination during use of the display device, and the second portions of the first and second link members are selectively rotatable by the user about the second horizontal axis of rotation relative to the horizontally extending support member between a fully forward position of the display device relative to the tray table and a fully rearward position of the display device relative to the tray table, and at least one position therebetween, with the second portions of the first and second link members rotatably coupled to the horizontally extending member to retain the display device in the user selected position during use of the display device.

18. An entertainment system for use by a user configured for coupling with a horizontally extending support member, the entertainment system comprising:
a display device pivotably coupled to the horizontally extending support member and having a front side and a back side;
a tray table having an outer surface and an inner surface and being configured for pivotable movement between a substantially vertical stowed position and a substantially horizontal deployed position, wherein the display device is pivotable relative to the tray table between a closed position wherein the inner surface of the tray table and the front side of the display device are substantially adjacent to each other and an open position wherein the inner surface of the tray table and the front side of the display device are spaced apart from each other, the inner surface of the tray table being configured for use as a table top when the display device is in the open position and the tray table is in the deployed position; and
a link arm having spaced apart first and second end portions, the first end portion being pivotably coupled to the display device at a position above the tray table for relative rotation between the link arm and the display device about a first horizontal axis of rotation positioned above the tray table and the second end portion being pivotably coupled to the horizontally extending support member for relative rotation between the link arm and the horizontally extending support member about a second horizontal axis of rotation spaced apart from the first horizontal axis of rotation to permit multiple horizontal axes of pivotable movement of the display device relative to the tray table when the display device is in the open position and the tray table is in the deployed position, the display device being selectively rotatable by the user about the first horizontal axis of rotation relative to the link arm between a fully forward inclination of the display device relative to the tray table and a fully rearward inclination of the display device relative to the tray table, and at least one inclination therebetween, with the link arm rotatably coupled to the display device to retain the display device in the user selected inclination during use of the display device, and the link arm being selectively rotatable by the user about the second horizontal axis of rotation relative to the horizontally extending support member between a fully forward position of the display device relative to the tray table and a fully rearward position of the display device relative to the tray table, and at least one position therebetween, with the link arm rotatably coupled to the horizontally extending member to retain the display device in the user selected position during use of the display device.

19. An entertainment system configured for coupling with a horizontally extending support member and use by a user positioned at a tray table having an outer surface and an inner surface and being configured for pivotable movement between a substantially vertical stowed position and a substantially horizontal deployed position, the entertainment system comprising:
- a display device having a front side and a back side, the display device being pivotable relative to the tray table between a closed position wherein the inner surface of the tray table and the front side of the display device are substantially adjacent to each other when the tray table is in the stowed position and an open position wherein the inner surface of the tray table and the front side of the display device are spaced apart from each other when the tray table is in the deployed position; and
- a link assembly including spaced apart first and second end portions, the first end portion being pivotably couplable to the display device for relative rotation between the link assembly and the display device about a first horizontal axis of rotation and the second end portion being pivotably couplable to the horizontally extending support member for relative rotation between the link assembly and the horizontally extending support member about a second horizontal axis of rotation spaced apart from the first horizontal axis of rotation to permit multiple horizontal axes of pivotable movement of the display device relative to the tray table when the display device is in the open position and the tray table is in the deployed position, the display device being selectively rotatable by the user about the first horizontal axis of rotation relative to the link assembly between a fully forward inclination of the display device relative to the tray table and a fully rearward inclination of the display device relative to the tray table, and at least one inclination therebetween, with the link assembly configured to retain the display device in the user selected inclination during use of the display device, and the link assembly being selectively rotatable by the user about the second horizontal axis of rotation relative to the horizontally extending support member between a fully forward position of the display device relative to the tray table and a fully rearward position of the display device relative to the tray table, and at least one position therebetween, with the link assembly configured to retain the display device in the user selected position during use of the display device.

20. The entertainment system of claim 19, wherein the link assembly includes a link arm comprising the link assembly apart first and second end portions, with the first end portion being a first friction hinge portion pivotably coupled to the display device and the second end portion being a second friction hinge portion pivotably coupled to the horizontally extending support member.

* * * * *